United States Patent
Oh

(10) Patent No.: US 10,869,017 B2
(45) Date of Patent: Dec. 15, 2020

(54) MULTIPLE-VIEWPOINTS RELATED METADATA TRANSMISSION AND RECEPTION METHOD AND APPARATUS

(71) Applicant: LG Electronics Inc., Seoul (KR)

(72) Inventor: Sejin Oh, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/382,798

(22) Filed: Apr. 12, 2019

(65) Prior Publication Data

US 2019/0320156 A1    Oct. 17, 2019

Related U.S. Application Data

(60) Provisional application No. 62/657,885, filed on Apr. 15, 2018.

(51) Int. Cl.
| | | |
|---|---|---|
| *H04N 21/4728* | (2011.01) | |
| *H04N 13/178* | (2018.01) | |
| *H04N 19/597* | (2014.01) | |
| *H04N 13/117* | (2018.01) | |

(52) U.S. Cl.
CPC ......... *H04N 13/178* (2018.05); *H04N 13/117* (2018.05); *H04N 19/597* (2014.11)

(58) Field of Classification Search
CPC .. H04N 13/178; H04N 19/597; H04N 13/117; H04N 19/46
See application file for complete search history.

(56) References Cited

U.S. PATENT DOCUMENTS

| | | | |
|---|---|---|---|
| 2002/0095265 A1 | 7/2002 | Satoh et al. | |
| 2005/0166163 A1 | 7/2005 | Chang et al. | |
| 2016/0364915 A1 | 12/2016 | Smith et al. | |
| 2018/0061002 A1* | 3/2018 | Lee | H04N 19/597 |
| 2018/0063505 A1* | 3/2018 | Lee | G06T 3/0018 |
| 2018/0103199 A1* | 4/2018 | Hendry | H04N 21/2343 |
| 2019/0045268 A1* | 2/2019 | Veeramani | H04N 21/4383 |
| 2019/0197661 A1* | 6/2019 | Choi | H04N 21/816 |
| 2019/0200023 A1* | 6/2019 | Hanhart | H04N 19/85 |
| 2019/0222822 A1* | 7/2019 | Wang | G06F 16/483 |
| 2019/0260990 A1* | 8/2019 | Lim | H04N 19/597 |

FOREIGN PATENT DOCUMENTS

| | | | | |
|---|---|---|---|---|
| KR | 20180013391 A | * | 2/2018 | ........... H04N 21/472 |
| KR | 20180028299 A | * | 3/2018 | ........... H04N 19/597 |
| KR | 20180029344 A | * | 3/2018 | ........ H04N 5/23238 |
| KR | 20180040507 A | | 4/2018 | |
| WO | 9804984 A1 | | 2/1998 | |
| WO | 2017204491 A1 | | 11/2017 | |

* cited by examiner

*Primary Examiner* — Howard D Brown, Jr.
(74) *Attorney, Agent, or Firm* — Dentons US LLP

(57) ABSTRACT

Disclosed is a 360-degree video data processing method performed by a 360-degree video transmission apparatus, the method including: obtaining 360-degree video data captured by at least one camera; deriving a two-dimensional (2D) picture comprising omnidirectional image by processing the 360-degree video data; generating metadata for the 360-degree video data; encoding information on the 2D picture; and performing encapsulation based on the encoded information on the 2D picture and the metadata, wherein the metadata comprises initial viewpoint ID information of viewpoint group which is related to the 360-degree video data.

15 Claims, 29 Drawing Sheets

FIG. 9A
(a) 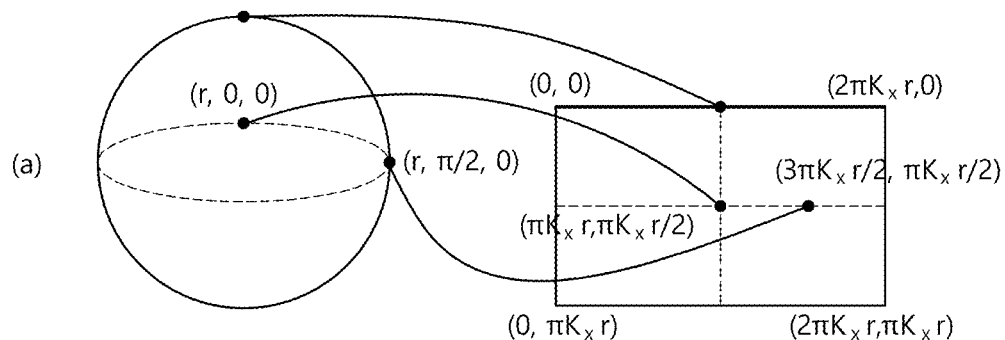
(b) 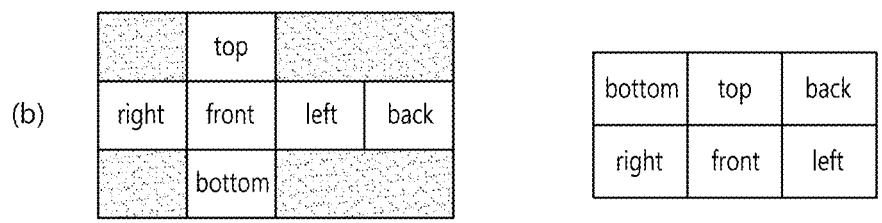
(c) 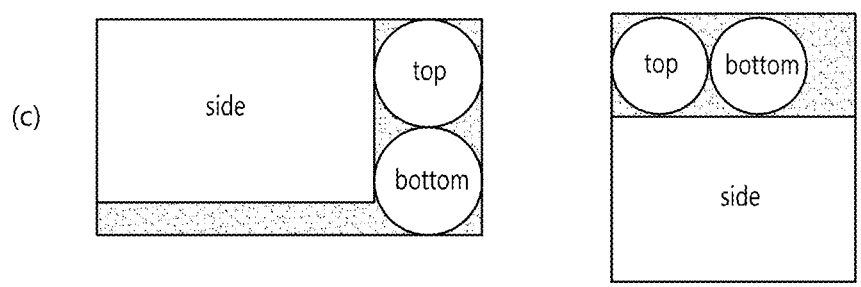
(d) 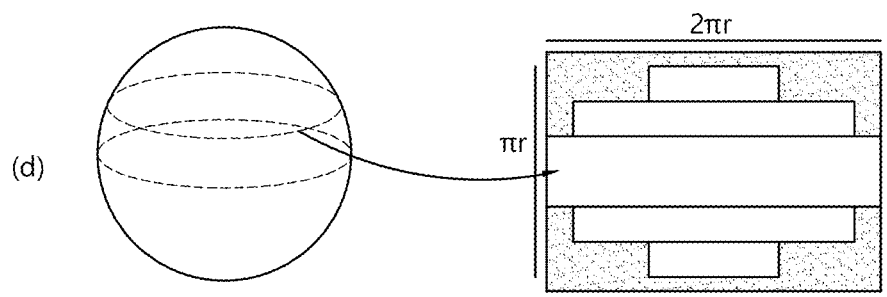

FIG. 9B
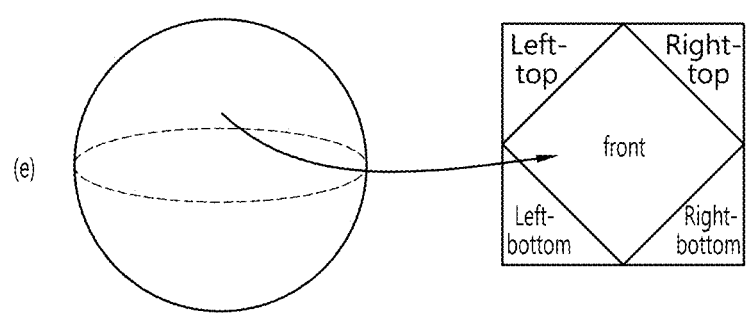
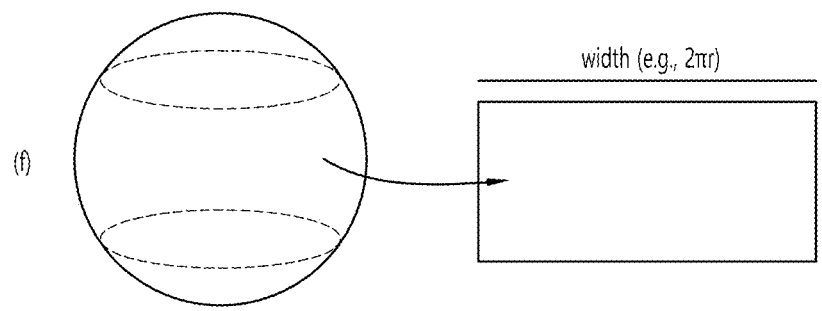
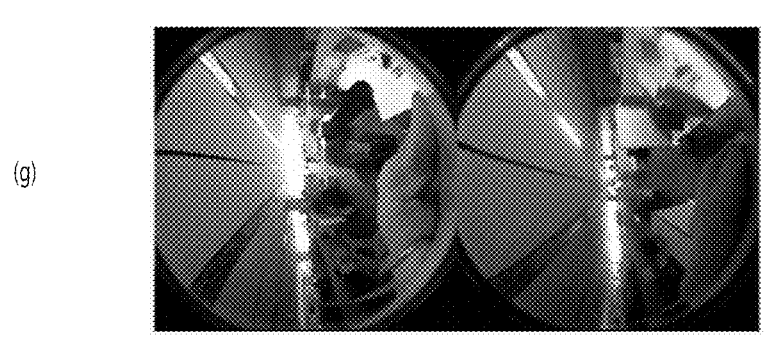

FIG. 11

```
...
        <basic metadata>
unsigned     int(8)      vr_geometry;
unsigned     int(8)      projection_schme;
        <Stereocopic related metadata>
unsigned     int(1)      is_stereoscopic;
unsigned     int(3)      stereo_mode;
        <Initial View related metadata>
signed       int(8)      initial_view_yaw_degree;
signed       int(8)      initial_view_pitch_degree;
signed       int(8)      initial_view_roll_degree;
        <ROI related metadata>
unsigned int(1)          2d_roi_range_flag;
unsigned int(1)          3d_roi_range_flag;
if (2d_roi_region_flag==1) {
  unsigned int(16) min_top_left_x;
  unsigned int(16) max_top_left_x;
  unsigned int(16) min_top_left_y;
  unsigned int(16) max_top_left_y;
  unsigned int(16) min_width;
  unsigned int(16) max_width;
  unsigned int(16) min_height;
  unsigned int(16) max_height;
  unsigned int(16) min_x;
  unsigned int(16) max_x;
  unsigned int(16) min_y;
  unsigned int(16) max_y;
}
if (3d_roi_region_flag==1{
  unsigned int(16) min_yaw;
  unsigned int(16) max_yaw;
  unsigned int(16) min_pitch;
  unsigned int(16) max_pitch;
  unsigned int(16) min_roll;
  unsigned int(16) max_roll;
  unsigned int(16) min_field_of_view;
  unsigned int(16) max_field_of_view;
}
        <Field Of View related metadata>
unsigned int(1)          content_fov_flag;
if (content_fov_flag==1) {
  unsigned int(16)       content_fov;
}
        <Cropped Region related metadata>
unsigned int(1)          is_copped_region;
if (content_fov_flag==1) {
  unsigned int(16)       cr_region_left_top_x;
  unsigned int(16)       cr_region_left_top_y;
  unsigned int(16)       cr_region_width;
  unsigned int(16)       cr_region_height;
}
...
```

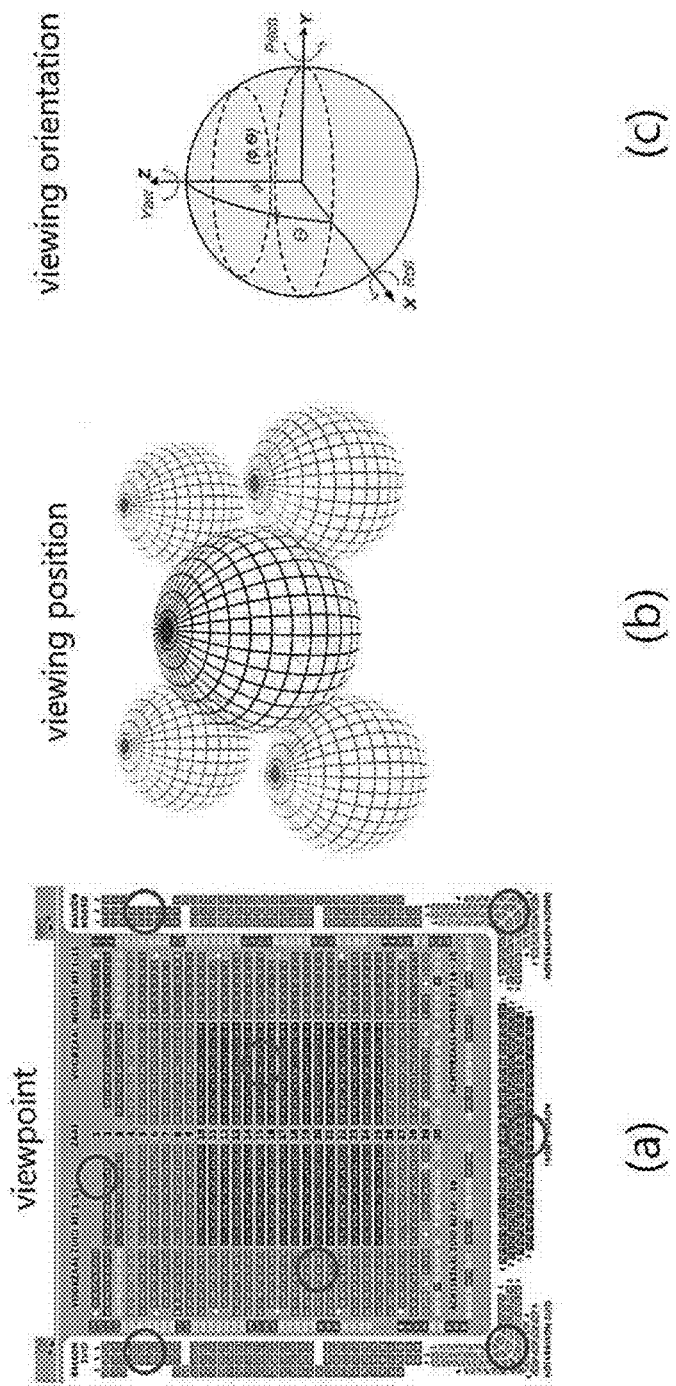

MULTIPLE-VIEWPOINTS RELATED METADATA TRANSMISSION AND RECEPTION METHOD AND APPARATUS

CROSS-REFERENCE TO RELATED APPLICATIONS

Pursuant to 35 U.S.C. § 119 (e), this application claims the benefit of U.S. Provisional Application No. 62/657,885, filed on Apr. 15, 2018, the contents of which are all hereby incorporated by reference herein in their entirety.

BACKGROUND OF THE INVENTION

Field of the Invention

The present invention relates to metadata for 360-degree video data, and more particularly to a method and an apparatus for transmitting and receiving metadata related to multiple-viewpoints.

Related Art

A virtual reality (VR) system provides a user with sensory experiences through which the user may feel as if he/she were in an electronically projected environment. An Augmented Reality (AR) system overlay a three-dimensional (3D) virtual image on an actual image or background of a real word, thereby allowing a user to feel as if the user is placed in an environment where a virtual reality and the real word are mixed. A system for providing VR may be further improved in order to provide higher-quality images and spatial sound. The VR or AR system may enable the user to interactively enjoy VR or AR content With increasing demands for VR or AR contents, there are increasing need to develop a method for signaling information on multiple-viewpoints in the VR or AR contents.

SUMMARY OF THE INVENTION

A technical object of the present invention is to provide a method and an apparatus for processing 360-degree video data Another technical object of the present invention is to provide a method and an apparatus for transmitting or receiving metadata for 360-degree video data.

Yet another technical object of the present invention is to provide a method and an apparatus for transmitting and receiving metadata for multiple-viewpoints.

Yet another technical object of the present invention is to provide a method and an apparatus for transmitting and receiving initial viewpoint ID information of a viewpoint group including multiple viewpoints.

Yet another technical object of the present invention is to provide a method and an apparatus for deriving initial viewpoints of a viewpoint group based on initial viewpoint ID information.

Yet another technical object of the present invention is to provide a method and an apparatus for transmitting and receiving a rotation angle of a center coordinate system of a viewpoint group.

According to an embodiment of the present invention, there is provided a 360-degree video data processing method performed by a 360-degree video transmission apparatus. The method includes: obtaining 360-degree video data captured by at least one camera; deriving a two-dimensional (2D) picture comprising omnidirectional image by processing the 360-degree video data; generating metadata for the 360-degree video data; encoding information on the 2D picture; and performing encapsulation based on the encoded picture and the metadata, wherein the metadata comprises initial viewpoint ID information of viewpoint group which is related to the 360-degree video data.

According to another embodiment of the present invention, there is provided a 360-degree video transmission apparatus processing 360-degree video data. The apparatus includes a data input unit configured to obtain 360-degree video data captured by at least one camera; a projection processor configured to derive a two-dimension (2D) picture including an omnidirectional image by processing the 360-degree video data; a metadata processor configured to generate metadata for the 360-degree video data; a data encoder configured to encode the information on the 2D picture; and an encapsulation processor configured to perform encapsulation based on the information on the 2D picture and the metadata.

According to yet another embodiment of the present invention, there is provided a 360-degree video reception method performed by a 360-degree video reception apparatus. The method includes: receiving information on 360-video data; obtaining information on an encoded picture and metadata from the 360-degree video data; decoding a picture based on the information on the encoded picture; and rendering the decoded picture based on the metadata, wherein the metadata includes initial viewpoint ID information of a viewpoint group related to the 360-degree video data.

According to yet another embodiment of the present invention, there is provided a 360-degree video reception apparatus. The apparatus includes: a reception processor configured to: receive information on 360-video data and obtain information on an encoded picture and metadata from the 360-degree video data; a data decoder configured to decode a picture based on the information on the encoded picture; and a renderer configured to render the decoded picture based on the metadata, wherein the metadata includes initial viewpoint ID information of a viewpoint group related to the 360-degree video data.

BRIEF DESCRIPTION OF THE DRAWINGS

FIGS. 9A to 9B exemplarily show projection formats according to some embodiments of the present invention.

FIG. 11 is a diagram showing an example of 360-degree-video related metadata according to an embodiment of the present invention.

FIG. 12 schematically shows concepts of a view point, a viewing position, and a viewing orientation.

DESCRIPTION OF EXEMPLARY EMBODIMENTS

Figure 1:
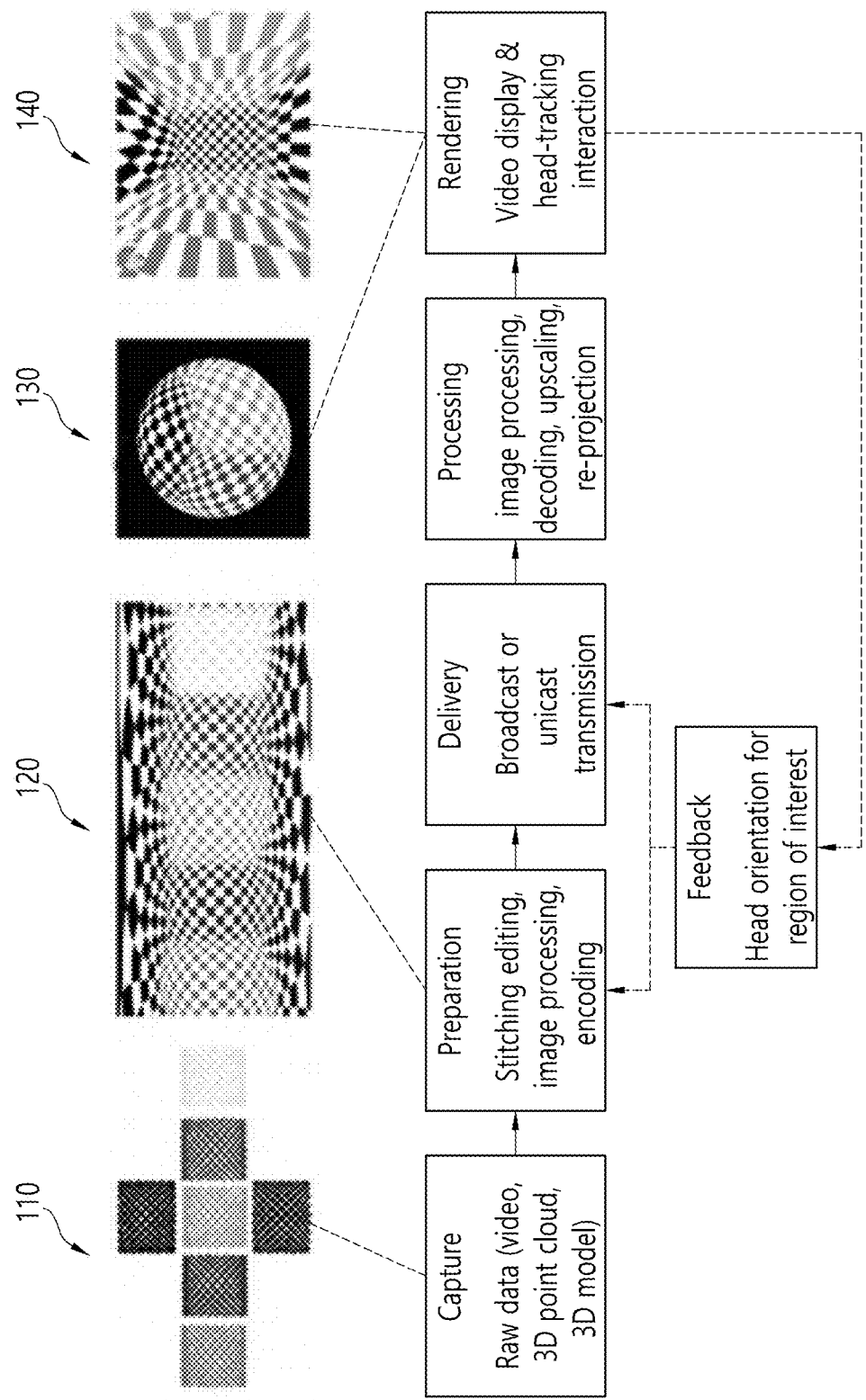
FIG. 1 is a diagram showing an overall architecture for providing 360 according to an embodiment of the present invention.

Technical features described in the following may apply to a standard set by the Moving Picture Experts Group (MPEG), and may be employed in video, image, or audio-related fields. For example, a method or embodiment disclosed in the following description may be related to disclosure of MPEG-I standard (ISO/IEC 23090), or disclosure of next-generation standards following the MPEG-I standard (ISO/IEC 23090).

The present invention may be modified in various forms, and specific embodiments thereof will be described and illustrated in the drawings. However, the embodiments are not intended for limiting the invention. The terms used in the following description are used to merely describe specific embodiments, but are not intended to limit the invention. An expression of a singular number includes an expression of the plural number, so long as it is clearly read differently. The terms such as "include" and "have" are intended to indicate that features, numbers, steps, operations, elements, components, or combinations thereof used in the following description exist and it should be thus understood that the possibility of existence or addition of one or more different features, numbers, steps, operations, elements, components, or combinations thereof is not excluded.

On the other hand, elements in the drawings described in the invention are independently drawn for the purpose of convenience for explanation of different specific functions, and do not mean that the elements are embodied by independent hardware or independent software. For example, two or more elements of the elements may be combined to form a single element, or one element may be divided into plural elements. The embodiments in which the elements are combined and/or divided belong to the invention without departing from the concept of the invention.

Hereinafter, preferred embodiments of the present invention will be described in more detail with reference to the attached drawings. Hereinafter, the same reference numbers will be used throughout this specification to refer to the same components and redundant description of the same component may be omitted.

FIG. 1 is a diagram showing an overall architecture for providing 360 content according to an embodiment of the present invention.

In the present specification, "image" may refer to a concept including a still image and a video that is a group of still images over time. In addition, the "video" does not necessarily refer to a group of still images over time, and, in some cases, a still image may be construed as being included in a video.

In order to provide a user with Virtual Reality (VR), a scheme for 360 content provision may be considered. Here, the 360-degree content may be called a three Degrees of Freedom (3DoF) contents, and VR may mean technology or an environment for replicating an actual or virtual environment or may mean the actual or virtual environment itself. VR artificially allow a user to experience with senses, and, through this experience, the user may feel as if he/she were in an electronically projected environment.

The term "360 content" means all content for realizing and providing VR, and may include 360-degree video and/or 360 audio. The term "360-degree video" and/or "360 audio" may be called a three-dimensional video and/or a three-dimensional audio. The term "360-degree video" may mean video or image content that is captured or reproduced in all directions (360 degrees) at the same time, which is necessary to provide VR. Hereinafter, the 360-degree video may refer to a 260-video. The 360-degree video may refer to a video or an image that appears in various kinds of 3D spaces depending on 3D models. For example, the 360-degree video may appear on a spherical surface. The term "360 audio", which is audio content for providing VR, may refer to spatial audio content in which the origin of a sound is recognized as being located in a specific 3D space. The 360 audio may be called 3D audio. The 360 content may be generated, processed, and transmitted to users, who may enjoy a VR experience using the 360 content. Hereinafter, 360 video may be called an omnidirectional video, and the 360 image may be called an omnidirectional image.

In order to provide a 360-degree video, the 360-degree video may be captured using at least one camera. The captured 360-degree video may be transmitted through a series of processes, and a reception side may process and render the received data into the original 360-degree video. As a result, the 360-degree video may be provided to a user.

Specifically, the overall processes of providing the 360-degree video may include a capturing process, a preparation process, a delivery process, a processing process, a rendering process, and/or a feedback process.

The capture process may refer to a process of capturing images or videos for a plurality of viewpoints through one or more cameras. Image/video data 110 shown in FIG. 1 may be generated through the capture process. Each plane of 110 in FIG. 1 may represent an image/video for each viewpoint. A plurality of captured images/videos may be referred to as raw data. Metadata related to capture can be generated during the capture process.

For capture, a special camera for VR may be used. When a 360 video with respect to a virtual space generated by a computer is provided according to an embodiment, capture through an actual camera may not be performed. In this case, a process of simply generating related data can substitute for the capture process.

The preparation process may be a process of processing captured images/videos and metadata generated in the capture process. Captured images/videos may be subjected to a stitching process, a projection process, a region-wise packing process and/or an encoding process during the preparation process.

First, each image/video may be subjected to the stitching process. The stitching process may be a process of connecting captured images/videos to generate one panorama image/video or spherical image/video.

Subsequently, stitched images/videos may be subjected to the projection process. In the projection process, the stitched images/videos may be projected on 2D image. The 2D image may be called a 2D image frame according to context. Projection on a 2D image may be referred to as mapping to a 2D image. Projected image/video data may have the form of a 2D image 120 in FIG. 1.

The video data projected on the 2D image may undergo the region-wise packing process in order to improve video coding efficiency. The region-wise packing process may be a process of individually processing the video data projected on the 2D image for each region. Here, the term "regions" may indicate divided parts of the 2D image on which the 360-degree video data are projected. In some embodiments, regions may be partitioned by uniformly or arbitrarily dividing the 2D image. Also, in some embodiments, regions may be partitioned depending on a projection scheme. The region-wise packing process is optional, and thus may be omitted from the preparation process.

In some embodiments, in order to improve video coding efficiency, this process may include a process of rotating each region or rearranging the regions on the 2D image. For example, the regions may be rotated such that specific sides of the regions are located so as to be adjacent to each other, whereby coding efficiency may be improved.

In some embodiments, this process may include a process of increasing or decreasing the resolution of a specific region in order to change the resolution for areas on the 360-degree video. For example, regions corresponding to relatively important areas in the 360-degree video may have higher resolution than other regions. The video data projected on the 2D image or the region-wise packed video data may undergo the encoding process via a video codec.

In some embodiments, the preparation process may further include an editing process. At the editing process, image/video data before and after projection may be edited. At the preparation process, metadata for stitching/projection/encoding/editing may be generated in the same manner. In addition, metadata for the initial viewport of the video data projected on the 2D image or a region of interest (ROI) may be generated.

The delivery process may be a process of processing and delivering the image/video data that have undergone the preparation process and the metadata. Processing may be performed based on an arbitrary transport protocol for delivery. The data that have been processed for delivery may be delivered through a broadcast network and/or a broadband connection. The data may be delivered to the reception side in an on-demand manner. The reception side may receive the data through various paths.

The processing process may be a process of decoding the received data and re-projecting the projected image/video data on a 3D model. In this process, the image/video data projected on the 2D image may be re-projected in a 3D space. Depending on the context, this process may be called mapping or projection. At this time, the mapped 3D space may have different forms depending on the 3D model. For example, the 3D model may be a sphere, a cube, a cylinder, or a pyramid.

In some embodiments, the processing process may further include an editing process and an up-scaling process. At the editing process, the image/video data before and after re-projection may be edited. In the case where the image/video data are down-scaled, the size of the image/video data may be increased through up-scaling at the up-scaling process. As needed, the size of the image/video data may be decreased through down-scaling.

The rendering process may be a process of rendering and displaying the image/video data re-projected in the 3D space. Depending on the context, a combination of re-projection and rendering may be expressed as rendering on the 3D model. The image/video re-projected on the 3D model (or rendered on the 3D model) may have the form as indicated by 130 in FIG. 1. The image/video indicated by 130 in FIG. 1 is re-projected on a spherical 3D model. The user may view a portion of the rendered image/video through a VR display. At this time, the portion of the image/video viewed by the user may have the form shown in (140) of FIG. 1.

The feedback process may be a process of transmitting various kinds of feedback information that may be acquired at a display process to a transmission side. Interactivity may be provided in enjoying the 360-degree video through the feedback process. In some embodiments, head orientation information, information about a viewport, which indicates the area that is being viewed by the user, etc. may be transmitted to the transmission side in the feedback process. In some embodiments, the user may interact with what is realized in the VR environment. In this case, information related to the interactivity may be provided to the transmission side or to a service provider side at the feedback process. In some embodiments, the feedback process may not be performed.

The head orientation information may be information about the position, angle, and movement of the head of the user. Information about the area that is being viewed by the user in the 360-degree video, i.e. the viewport information, may be calculated based on this information.

The viewport information may be information about the area that is being viewed by the user in the 360-degree video. Gaze analysis may be performed therethrough, and therefore it is possible to check the manner in which the user enjoys the 360-degree video, the area of the 360-degree video at which the user gazes, and the amount of time during which the user gazes at the 360-degree video. The gaze analysis may be performed on the reception side and may be delivered to the transmission side through a feedback channel. An apparatus, such as a VR display, may extract a viewport area based on the position/orientation of the head of the user, a vertical or horizontal FOV that is supported by the apparatus, etc.

In some embodiments, the feedback information may not only be delivered to the transmission side, but may also be used in the reception side. That is, the decoding, re-projection, and rendering processes may be performed in the reception side using the feedback information. For example, only the portion of the 360-degree video that is being viewed by the user may be decoded and rendered first using the head orientation information and/or the viewport information.

Here, the viewport or the viewport area may be the portion of the 360-degree video that is being viewed by the user. The viewport, which is the point in the 360-degree video that is being viewed by the user, may be the very center of the viewport area. That is, the viewport is an area based on the viewport. The size or shape of the area may be set by a field of view (FOV), a description of which will follow.

In the entire architecture for 360-degree video provision, the image/video data that undergo a series of capturing/projection/encoding/delivery/decoding/re-projection/rendering processes may be called 360-degree video data. The term "360-degree video data" may be used to conceptually include metadata or signaling information related to the image/video data.

In order to store and transmit media data such as the above-described audio or video, a formalized media file format may be defined. In some embodiments, the media file according to the present invention may have a file format based on ISO base media file format (ISO BMFF).

Figure 2:
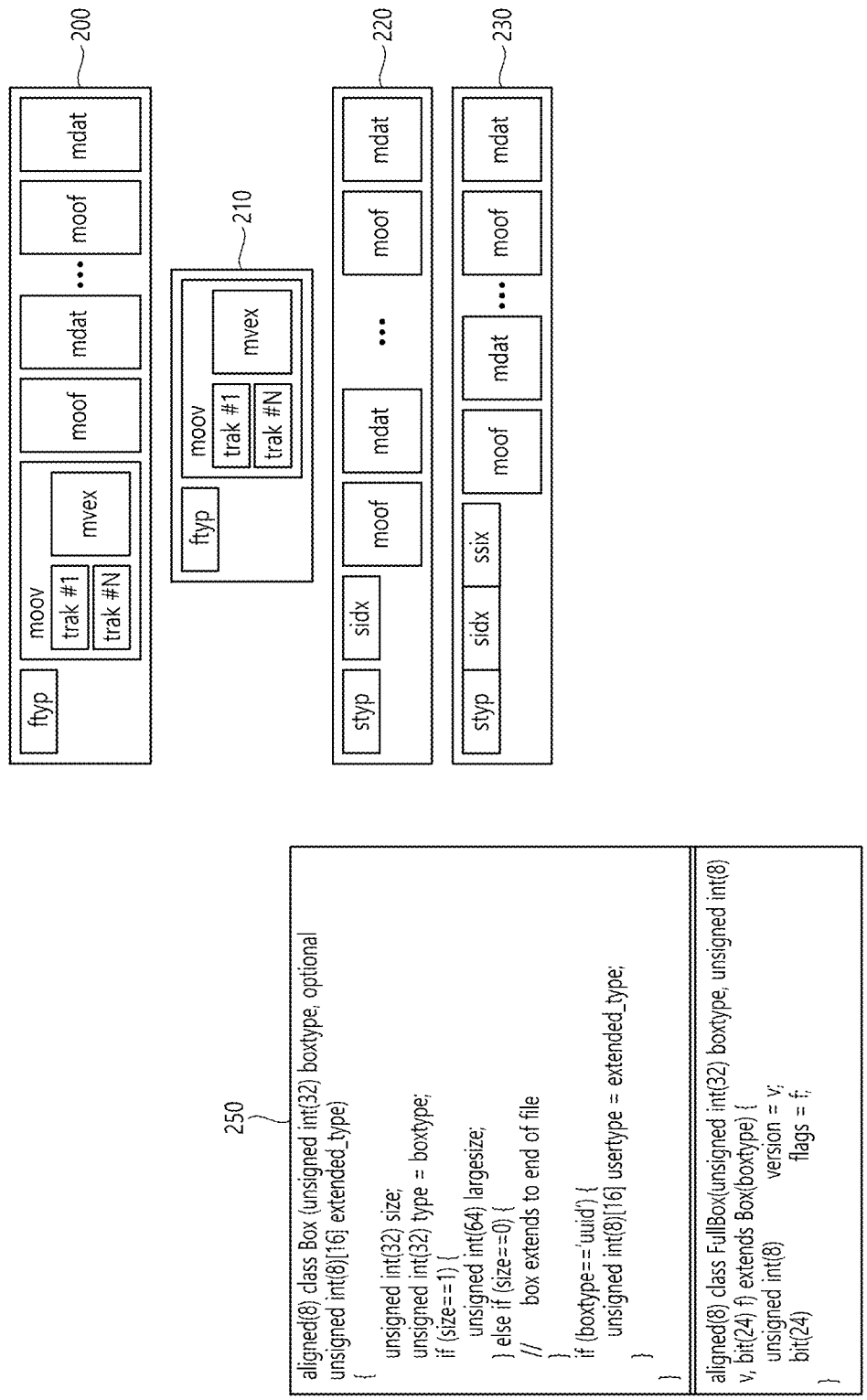
FIGS. 2 and 3 are views showing the structure of a media file according to an aspect of the present invention.
Figure 3:
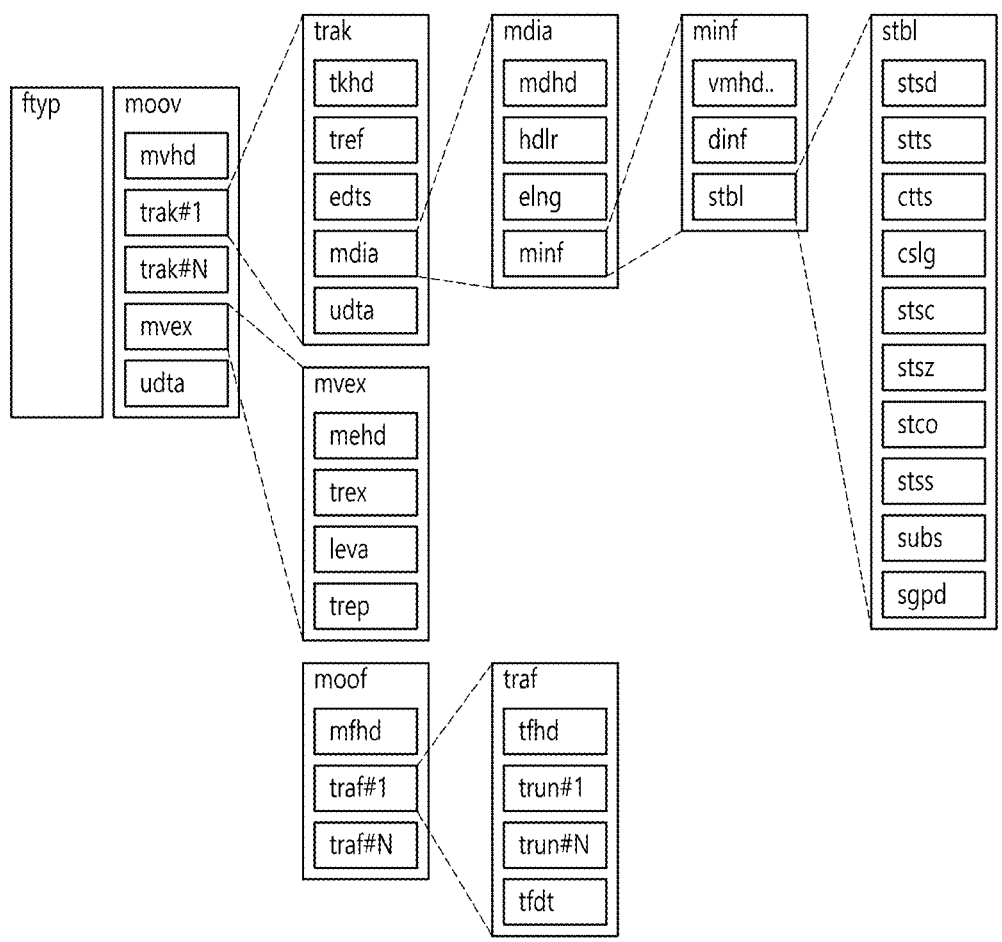

FIGS. 2 and 3 are views showing the structure of a media file according to an aspect of the present invention.

The media file according to an embodiment may include at least one box. Here, a box may be a data block or an object including media data or metadata related to media data. Boxes may be in a hierarchical structure and thus data can be classified and media files can have a format suitable for storage and/or transmission of large-capacity media data. Further, media files may have a structure which allows users to easily access media information such as moving to a specific point of media content.

The media file according to an embodiment may include an ftyp box, a moov box and/or an mdat box.

The ftyp box (file type box) can provide file type or compatibility related information about the corresponding media file. The ftyp box may include configuration version information about media data of the corresponding media file. A decoder can identify the corresponding media file with reference to ftyp box.

The moov box (movie box) may be a box including metadata about media data of the corresponding media file. The moov box may serve as a container for all metadata. The moov box may be a highest layer among boxes related to metadata. According to an embodiment, only one moov box may be present in a media file.

The mdat box (media data box) may be a box containing actual media data of the corresponding media file. Media data may include audio samples and/or video samples. The mdat box may serve as a container containing such media samples.

According to an embodiment, the aforementioned moov box may further include an mvhd box, a trak box and/or an mvex box as lower boxes.

The mvhd box (movie header box) may include information related to media presentation of media data included in the corresponding media file. That is, the mvhd box may include information such as a media generation time, change time, time standard and period of corresponding media presentation.

The trak box (track box) can provide information about a track of corresponding media data. The trak box can include information such as stream related information, presentation related information and access related information about an audio track or a video track. A plurality of trak boxes may be present depending on the number of tracks.

The trak box may further include a tkhd box (track head box) as a lower box. The tkhd box can include information about the track indicated by the trak box. The tkhd box can include information such as a generation time, a change time and a track identifier of the corresponding track.

The mvex box (movie extend box) can indicate that the corresponding media file may have a moof box which will be described later. To recognize all media samples of a specific track, moof boxes may need to be scanned.

According to an embodiment, the media file according to an embodiment may be divided into a plurality of fragments (200). Accordingly, the media file can be fragmented and stored or transmitted. Media data (mdat box) of the media file can be divided into a plurality of fragments and each fragment can include a moof box and a divided mdat box. According to an embodiment, information of the ftyp box and/or the moov box may be required to use the fragments.

The moof box (movie fragment box) can provide metadata about media data of the corresponding fragment. The moof box may be a highest-layer box among boxes related to metadata of the corresponding fragment.

The mdat box (media data box) can include actual media data as described above. The mdat box can include media samples of media data corresponding to each fragment corresponding thereto.

According to an embodiment, the aforementioned moof box may further include an mfhd box and/or a traf box as lower boxes.

The mfhd box (movie fragment header box) can include information about correlation between divided fragments. The mfhd box can indicate the order of divided media data of the corresponding fragment by including a sequence number. Further, it is possible to check whether there is missed data among divided data using the mfhd box.

The traf box (track fragment box) can include information about the corresponding track fragment. The traf box can provide metadata about a divided track fragment included in the corresponding fragment. The traf box can provide metadata such that media samples in the corresponding track fragment can be decoded/reproduced. A plurality of traf boxes may be present depending on the number of track fragments.

According to an embodiment, the aforementioned traf box may further include a tfhd box and/or a trun box as lower boxes.

The tfhd box (track fragment header box) can include header information of the corresponding track fragment. The tfhd box can provide information such as a basic sample size, a period, an offset and an identifier for media samples of the track fragment indicated by the aforementioned traf box.

The trun box (track fragment run box) can include information related to the corresponding track fragment. The trun box can include information such as a period, a size and a reproduction time for each media sample.

The aforementioned media file and fragments thereof can be processed into segments and transmitted. Segments may include an initialization segment and/or a media segment.

A file of the illustrated embodiment 210 may include information related to media decoder initialization except media data. This file may correspond to the aforementioned initialization segment, for example. The initialization segment can include the aforementioned ftyp box and/or moov box.

A file of the illustrated embodiment 220 may include the aforementioned fragment. This file may correspond to the aforementioned media segment, for example. The media segment may further include an styp box and/or an sidx box.

The styp box (segment type box) can provide information for identifying media data of a divided fragment. The styp box can serve as the aforementioned ftyp box for a divided fragment. According to an embodiment, the styp box may have the same format as the ftyp box.

The sidx box (segment index box) can provide information indicating an index of a divided fragment. Accordingly, the order of the divided fragment can be indicated.

According to an embodiment 230, an ssix box may be further included. The ssix box (sub-segment index box) can provide information indicating an index of a sub-segment when a segment is divided into sub-segments.

Boxes in a media file can include more extended information based on a box or a FullBox as shown in the illustrated embodiment 250. In the present embodiment, a size field and a largesize field can represent the length of the corresponding box in bytes. A version field can indicate the version of the corresponding box format. A type field can indicate the type or identifier of the corresponding box. A flags field can indicate a flag associated with the corresponding box.

Meanwhile, fields (properties) related to 360-degree video according to an embodiment of the present invention may be included in a DASH-based adaptive streaming model to be transmitted.

Figure 4:
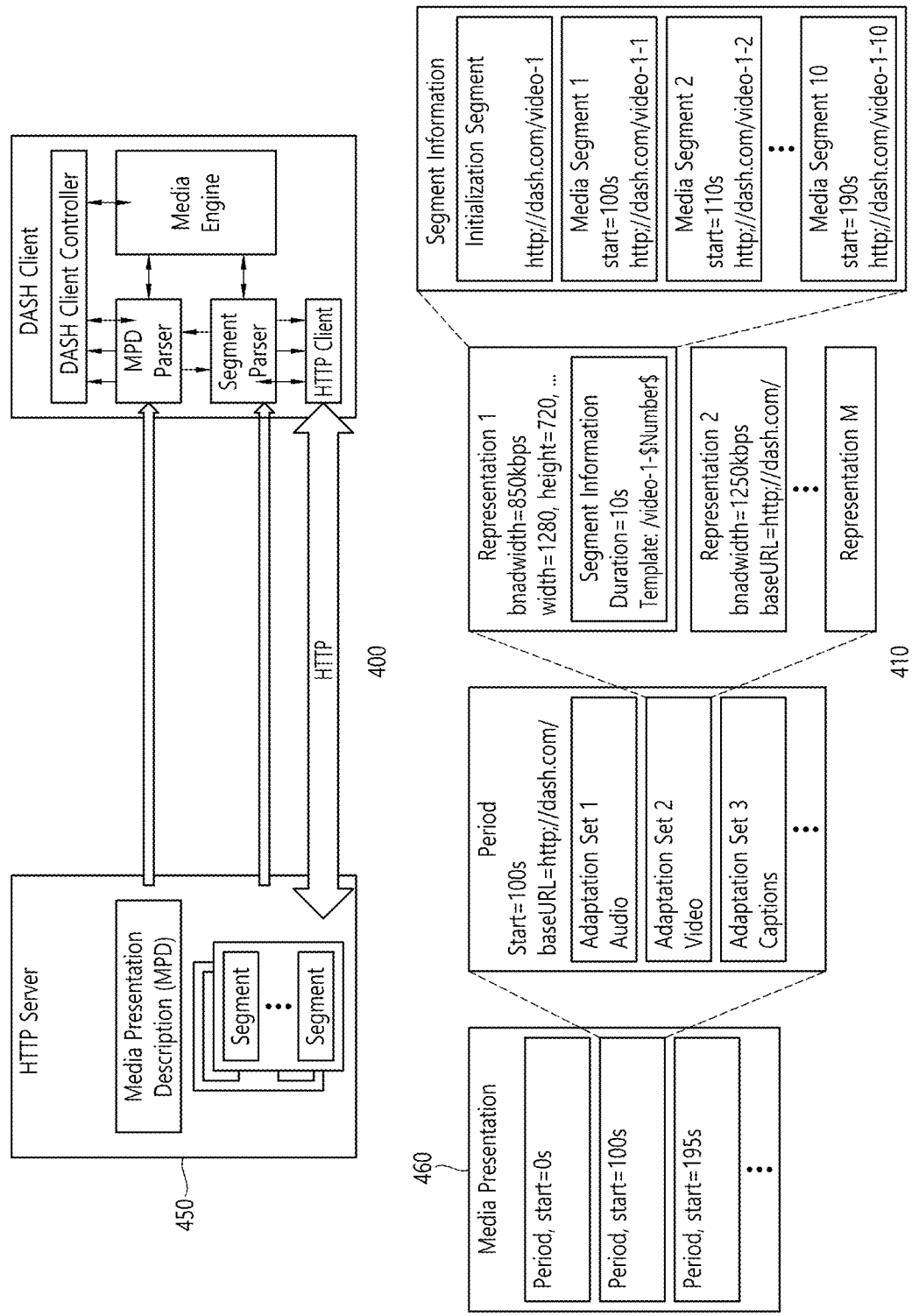
FIG. 4 is a view showing the overall operation of a Dynamic Adaptive Streaming over HTTP (DASH)-based adaptive streaming model according to an embodiment of the present invention.

FIG. 4 is a view showing the overall operation of a DASH-based adaptive streaming model according to an embodiment of the present invention.

A DASH-based adaptive streaming model according to the embodiment shown in (400) describes the operation between an HTTP server and a DASH client. Here, Dynamic Adaptive Streaming over HTTP (DASH), which is a protocol for supporting HTTP-based adaptive streaming, may dynamically support streaming depending on network conditions. As a result, AV content may be reproduced without interruption.

First, the DASH client may acquire MPD. The MPD may be delivered from a service provider such as an HTTP server. The DASH client may request a segment described in the MPD from the server using information about access to the segment. Here, this request may be performed in consideration of network conditions.

After acquiring the segment, the DASH client may process the segment using a media engine, and may display the segment on a screen. The DASH client may request and acquire a necessary segment in real-time consideration of reproduction time and/or network conditions (Adaptive Streaming). As a result, content may be reproduced without interruption.

Media Presentation Description (MPD) is a file including detailed information enabling the DASH client to dynamically acquire a segment, and may be expressed in the form of XML.

A DASH client controller may generate a command for requesting MPD and/or a segment in consideration of network conditions. In addition, this controller may perform control such that the acquired information can be used in an internal block such as the media engine.

An MPD parser may parse the acquired MPD in real time. In doing so, the DASH client controller may generate a command for acquiring a necessary segment.

A segment parser may parse the acquired segment in real time. The internal block such as the media engine may perform a specific operation depending on information included in the segment.

An HTTP client may request necessary MPD and/or a necessary segment from the HTTP server. In addition, the HTTP client may deliver the MPD and/or segment acquired from the server to the MPD parser or the segment parser.

The media engine may display content using media data included in the segment. In this case, information of the MPD may be used.

A DASH data model may have a hierarchical structure (410). Media presentation may be described by the MPD. The MPD may describe the temporal sequence of a plurality of periods making media presentation. One period may indicate one section of the media content.

In one period, data may be included in adaptation sets. An adaptation set may be a set of media content components that can be exchanged with each other. Adaptation may include a set of representations. One representation may correspond to a media content component. In one representation, content may be temporally divided into a plurality of segments. This may be for appropriate access and delivery. A URL of each segment may be provided in order to access each segment.

The MPD may provide information related to media presentation. A period element, an adaptation set element, and a representation element may describe a corresponding period, adaptation set, and representation, respectively. One representation may be divided into sub-representations. A sub-representation element may describe a corresponding sub-representation.

Here, common attributes/elements may be defined. The common attributes/elements may be applied to (included in) the adaptation set, the representation, and the sub-representation. EssentialProperty and/or SupplementalProperty may be included in the common attributes/elements.

EssentialProperty may be information including elements considered to be essential to process data related to the media presentation. SupplementalProperty may be information including elements that may be used to process data related to the media presentation. In some embodiments, in the case where signaling information, a description of which will follow, is delivered through the MPD, the signaling information may be delivered while being defined in EssentialProperty and/or SupplementalProperty.

Figure 5:
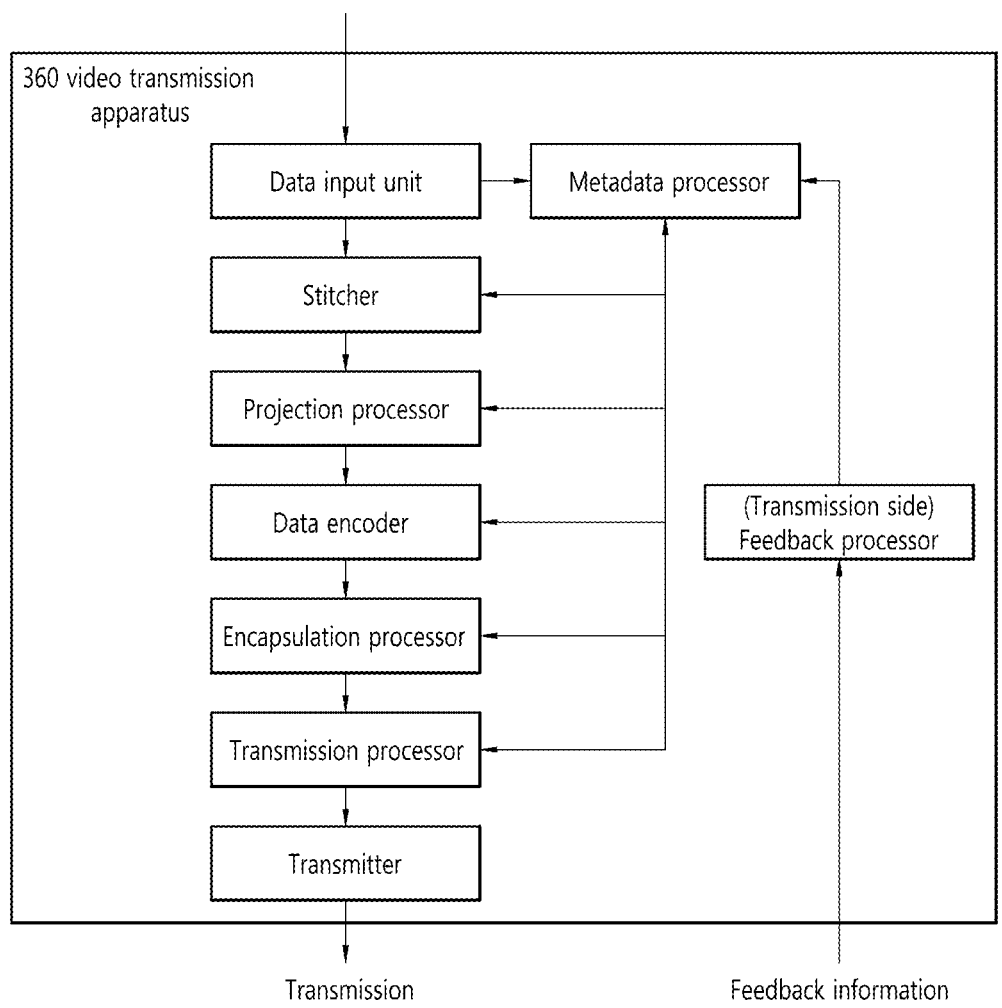
FIG. 5 is a diagram schematically showing configuration of a 360 video transmission apparatus according to an embodiment of the present invention.

FIG. 5 is a diagram schematically showing configuration of a 360 video transmission apparatus according to an embodiment of the present invention.

The 360 video transmission apparatus according to an embodiment can perform operations related the above-described preparation process and the transmission process. The 360 video transmission apparatus may include a data input unit, a stitcher, a projection processor, a region-wise packing processor (not shown), a metadata processor, a (transmission side) feedback processor, a data encoder, an encapsulation processor, a transmission processor and/or a transmitter as internal/external elements.

The data input unit can receive captured images/videos for respective viewpoints. The images/videos for the respective viewpoints may be images/videos captured by one or more cameras. Further, data input unit may receive metadata generated in a capture process. The data input unit may forward the received images/videos for the viewpoints to the stitcher and forward metadata generated in the capture process to the signaling processor.

The stitcher can perform a stitching operation on the captured images/videos for the viewpoints. The stitcher may forward stitched 360 video data to the projection processor. The stitcher may receive necessary metadata from the metadata processor and use the metadata for the stitching operation as necessary. The stitcher may forward metadata generated in the stitching process to the metadata processor. The metadata in the stitching process may include information such as information representing whether stitching has been performed, and a stitching type.

The projection processor can project the stitched 360 video data on a 2D image. The projection processor may perform projection according to various schemes which will be described later. The projection processor may perform mapping in consideration of the depth of 360 video data for each viewpoint. The projection processor may receive metadata necessary for projection from the metadata processor and use the metadata for the projection operation as necessary. The projection processor may forward metadata generated in the projection process to the metadata processor. Metadata generated in the projection processor may include a projection scheme type and the like.

The region-wise packing processor (not shown) can perform the aforementioned region-wise packing process. That is, the region-wise packing processor can perform the process of dividing the projected 360 video data into regions and rotating and rearranging regions or changing the resolution of each region. As described above, the region-wise packing process is optional and thus the region-wise packing processor may be omitted when region-wise packing is not performed. The region-wise packing processor may receive metadata necessary for region-wise packing from the metadata processor and use the metadata for a region-wise packing operation as necessary. The region-wise packing processor may forward metadata generated in the region-wise packing process to the metadata processor. Metadata generated in the region-wise packing processor may include a rotation degree, size and the like of each region.

The aforementioned stitcher, projection processor and/or the region-wise packing processor may be integrated into a single hardware component according to an embodiment.

The metadata processor can process metadata which may be generated in a capture process, a stitching process, a projection process, a region-wise packing process, an encoding process, an encapsulation process and/or a process for transmission. The metadata processor can generate 360 video related metadata using such metadata. According to an embodiment, the metadata processor may generate the 360 video related metadata in the form of a signaling table. 360 video related metadata may also be called metadata or 360 video related signaling information according to signaling context. Further, the metadata processor may forward the acquired or generated metadata to internal elements of the 360 video transmission apparatus as necessary. The metadata processor may forward the 360 video related metadata to the data encoder, the encapsulation processor and/or the transmission processor such that the 360 video related metadata can be transmitted to a reception side.

The data encoder can encode the 360 video data projected on the 2D image and/or region-wise packed 360 video data. The 360 video data can be encoded in various formats.

The encapsulation processor can encapsulate the encoded 360 video data and/or 360 video related metadata in a file format. Here, the 360 video related metadata may be received from the metadata processor. The encapsulation processor can encapsulate the data in a file format such as ISOBMFF, CFF or the like or process the data into a DASH segment or the like. The encapsulation processor may include the 360 video related metadata in a file format. The 360 video related metadata may be included in a box having various levels in SOBMFF or may be included as data of a separate track in a file, for example. According to an embodiment, the encapsulation processor may encapsulate the 360 video related metadata into a file. The transmission processor may perform processing for transmission on the encapsulated 360 video data according to file format. The transmission processor may process the 360 video data according to an arbitrary transmission protocol. The processing for transmission may include processing for delivery over a broadcast network and processing for delivery over a broadband. According to an embodiment, the transmission processor may receive 360 video related metadata from the metadata processor as well as the 360 video data and perform the processing for transmission on the 360 video related metadata.

The transmitter can transmit the 360 video data and/or the 360 video related metadata processed for transmission through a broadcast network and/or a broadband. The transmitter may include an element for transmission through a broadcast network and/or an element for transmission through a broadband.

According to an embodiment of the 360 video transmission apparatus according to an embodiment, the 360 video transmission apparatus may further include a data storage unit (not shown) as an internal/external element. The data storage unit may store encoded 360 video data and/or 360 video related metadata before the encoded 360 video data and/or 360 video related metadata are delivered to the transmission processor. Such data may be stored in a file format such as ISOBMFF. Although the data storage unit may not be required when 360 video is transmitted in real time, encapsulated 360 data may be stored in the data storage unit for a certain period of time and then transmitted when the encapsulated 360 data is delivered over a broadband.

According to another embodiment of the 360 video transmission apparatus according to an embodiment, the 360 video transmission apparatus may further include a (transmission side) feedback processor and/or a network interface (not shown) as internal/external elements. The network interface can receive feedback information from a 360 video reception apparatus according to an embodiment and forward the feedback information to the transmission side feedback processor. The transmission side feedback processor can forward the feedback information to the stitcher, the projection processor, the region-wise packing processor, the data encoder, the encapsulation processor, the metadata processor and/or the transmission processor. According to an embodiment, the feedback information may be delivered to the metadata processor and then delivered to each internal element. Internal elements which have received the feedback information can reflect the feedback information in the following 360 video data processing.

According to another embodiment of the 360 video transmission apparatus according to an embodiment, the region-wise packing processor may rotate regions and map the rotated regions on a 2D image. Here, the regions may be rotated in different directions at different angles and mapped on the 2D image. Region rotation may be performed in consideration of neighboring parts and stitched parts of 360 video data on a spherical surface before projection. Information about region rotation, that is, rotation directions, angles and the like may be signaled through 360 video related metadata. According to another embodiment of the 360 video transmission apparatus according to an embodiment, the data encoder may perform encoding differently for respective regions. The data encoder may encode a specific region in high quality and encode other regions in low quality. The transmission side feedback processor may forward feedback information received from the 360 video reception apparatus to the data encoder such that the data encoder can use encoding methods differentiated for respective regions. For example, the transmission side feedback processor may forward viewport information received from a reception side to the data encoder. The data encoder may encode regions including an area indicated by the viewport information in higher quality (UHD and the like) than that of other regions.

According to another embodiment of the 360 video transmission apparatus according to an embodiment, the transmission processor may perform processing for transmission differently for respective regions. The transmission processor may apply different transmission parameters (modulation orders, code rates, and the like) to the respective regions such that data delivered to the respective regions have different robustnesses.

Here, the transmission side feedback processor may forward feedback information received from the 360 video reception apparatus to the transmission processor such that the transmission processor can perform transmission processes differentiated for respective regions. For example, the transmission side feedback processor may forward viewport information received from a reception side to the transmission processor. The transmission processor may perform a transmission process on regions including an area indicated by the viewport information such that the regions have higher robustness than other regions.

The above-described internal/external elements of the 360 video transmission apparatus according to an embodiment may be hardware elements. According to an embodiment, the internal/external elements may be changed, omitted, replaced by other elements or integrated.

Figure 6:
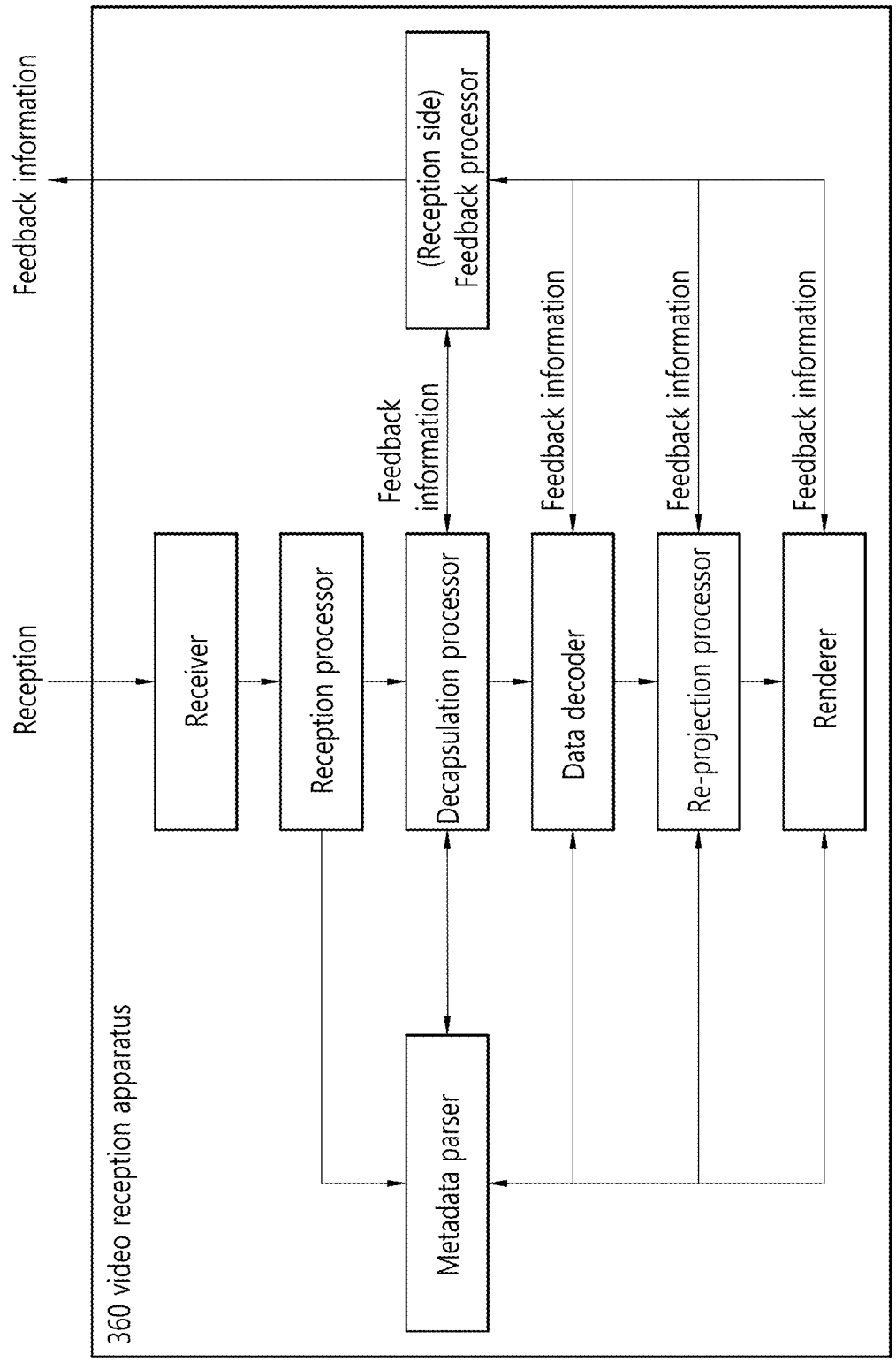
FIG. 6 is a view schematically illustrating a configuration of a 360 video reception apparatus according to an embodiment.

FIG. 6 is a view schematically illustrating a configuration of a 360 video reception apparatus according to an embodiment.

The 360 video reception apparatus according to an embodiment can perform operations related to the above-described processing process and/or the rendering process. The 360 video reception apparatus may include a receiver, a reception processor, a decapsulation processor, a data decoder, a metadata parser, a (reception side) feedback processor, a re-projection processor and/or a renderer as internal/external elements. A signaling parser may be called the metadata parser.

The receiver can receive 360 video data transmitted from the 360 video transmission apparatus according to an embodiment. The receiver may receive the 360 video data through a broadcast network or a broadband depending on a channel through which the 360 video data is transmitted.

The reception processor can perform processing according to a transmission protocol on the received 360 video data. The reception processor may perform a reverse process of the process of the aforementioned transmission processor such that the reverse process corresponds to processing for transmission performed at the transmission side. The reception processor can forward the acquired 360 video data to the decapsulation processor and forward acquired 360 video related metadata to the metadata parser. The 360 video related metadata acquired by the reception processor may have the form of a signaling table.

The decapsulation processor can decapsulate the 360 video data in a file format received from the reception processor. The decapsulation processor can acquired 360 video data and 360 video related metadata by decapsulating files in ISOBMFF or the like. The decapsulation processor can forward the acquired 360 video data to the data decoder and forward the acquired 360 video related metadata to the metadata parser. The 360 video related metadata acquired by the decapsulation processor may have the form of a box or a track in a file format. The decapsulation processor may receive metadata necessary for decapsulation from the metadata parser as necessary.

The data decoder can decode the 360 video data. The data decoder may receive metadata necessary for decoding from the metadata parser. The 360 video related metadata acquired in the data decoding process may be forwarded to the metadata parser.

The metadata parser can parse/decode the 360 video related metadata. The metadata parser can forward acquired metadata to the data decapsulation processor, the data decoder, the re-projection processor and/or the renderer.

The re-projection processor can perform re-projection on the decoded 360 video data. The re-projection processor can re-project the 360 video data on a 3D space. The 3D space may have different forms depending on 3D models. The re-projection processor may receive metadata necessary for re-projection from the metadata parser. For example, the re-projection processor may receive information about the type of a used 3D model and detailed information thereof from the metadata parser. According to an embodiment, the re-projection processor may re-project only 360 video data corresponding to a specific area of the 3D space on the 3D space using metadata necessary for re-projection.

The renderer can render the re-projected 360 video data. As described above, re-projection of 360 video data on a 3D space may be represented as rendering of 360 video data on the 3D space. When two processes simultaneously occur in this manner, the re-projection processor and the renderer may be integrated and the renderer may perform the processes. According to an embodiment, the renderer may render only a part viewed by a user according to viewpoint information of the user.

The user may view a part of the rendered 360 video through a VR display or the like. The VR display is a device which reproduces 360 video and may be included in a 360 video reception apparatus (tethered) or connected to the 360 video reception apparatus as a separate device (un-tethered).

According to an embodiment of the 360 video reception apparatus according to an embodiment, the 360 video reception apparatus may further include a (reception side) feedback processor and/or a network interface (not shown) as internal/external elements. The reception side feedback processor can acquire feedback information from the renderer, the re-projection processor, the data decoder, the decapsulation processor and/or the VR display and process the feedback information. The feedback information may include viewport information, head orientation information, gaze information, and the like. The network interface can receive the feedback information from the reception side feedback processor and transmit the feedback information to a 360 video transmission apparatus.

As described above, the feedback information may be consumed at the reception side as well as being transmitted to the transmission side. The reception side feedback processor may forward the acquired feedback information to internal elements of the 360 video reception apparatus such that the feedback information is reflected in processes such as rendering. The reception side feedback processor can forward the feedback information to the renderer, the re-projection processor, the data decoder and/or the decapsulation processor. For example, the renderer can preferentially render an area viewed by the user using the feedback information. In addition, the decapsulation processor and the data decoder can preferentially decapsulate and decode an area being viewed or will be viewed by the user.

The above-described internal/external elements of the 360 video reception apparatus according to an embodiment may be hardware elements. According to an embodiment, the internal/external elements may be changed, omitted, replaced by other elements or integrated. According to an embodiment, additional elements may be added to the 360 video reception apparatus.

In another aspect, the operation method of the 360 video reception apparatus according to the aforementioned embodiment may be related to a 360 video transmitting method and a 360 video receiving method. The 360 video transmitting/receiving method according to an embodiment may be performed by the aforementioned 360 video transmission/reception apparatus or embodiments of the apparatus.

Respective embodiments of the 360 video transmission/reception apparatus and the 360 video transmission/reception method according to the aforementioned embodiments, and embodiments of inner/external elements thereof may be combined. For example, embodiments of the projection processor and embodiments of the data encoder may be combined to produce embodiments of the 360 video transmission apparatus as much as the combined embodiments of the projection processor and the data encoder.

Figure 7:
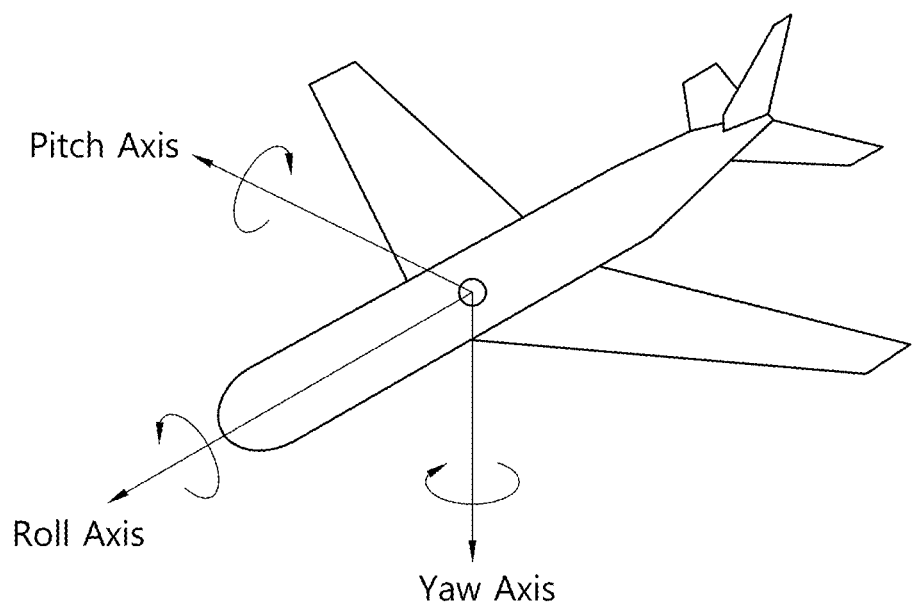
FIG. 7 is a view showing the concept of aircraft principal axes for describing 3D space according to an embodiment of the present invention.

FIG. 7 is a view showing the concept of aircraft principal axes for describing 3D space according to an embodiment of the present invention.

In the present invention, the concept of aircraft principal axes may be used in order to express a specific point, position, direction, distance, area, etc. in the 3D space. That is, in the present invention, the 3D space before projection or after re-projection may be described, and the concept of principal aircraft axes may be used in order to perform signaling thereon. In some embodiments, a method of using an orthogonal coordinate system or a spherical coordinate system using X, Y, and Z-axes may be used.

An aircraft may freely rotate in three dimensions. Axes constituting the three dimensions are referred to as a pitch axis, a yaw axis, and a roll axis. In the present specification, these terms may also be expressed either as pitch, yaw, and roll or as a pitch direction, a yaw direction, and a roll direction.

In one example, the roll axis may correspond to X axis in the orthogonal coordinate system or the back-to-front axis. Or, in the shown concept of principal aircraft axes, the roll axis may be an axis extending from the forward portion to the tail of the aircraft. Rotation in the roll direction may be rotation performed about the roll axis. The range of a roll value indicating an angle of rotation about the roll axis may be between −180 degree and 180 degree. In this case, −180 degree and 180 degree, which are edge values, may be included in the range of a roll value.

In another embodiment, the pitch axis may correspond to Y axis in the orthogonal coordinate system or the side-to-side axis. Or, the pitch axis may be an axis about which the forward portion of the aircraft is rotated upwards/downwards. In the shown concept of principal aircraft axes, the pitch axis may be an axis extending from one wing to another wing of the aircraft. The range of a pitch value indicating an angle of rotation about the pitch axis may be between −90 degree and 90 degree. In this case, −90 degree and 90 degree, which are edge values, may be included in the range of a pitch value.

In yet another example, the yaw axis may correspond to Z axis in the orthogonal coordinate system or the vertical axis. Or, the yaw axis may be an axis about which the forward portion of the aircraft is rotated leftwards/rightwards. In the shown concept of principal aircraft axes, the yaw axis may be an axis extending from the top to the bottom of the aircraft. The range of a yaw value indicating an angle of rotation about the yaw axis may be between −180 degree and 180 degree. In this case, −180 degree and 180 degree, which are edge values, may be included in the range of a yaw value.

The center point, which is the basis for determining the yaw axis, the pitch axis, and the roll axis in a 3D space according to an embodiment, may not be static.

As described above, the 3D space in the present invention may be described using the pitch, yaw, and roll concept.

Meanwhile, as described above, video data projected on a 2D image may undergo a region-wise packing process in order to improve video coding efficiency. The region-wise packing process may be a process of individually processing the video data projected on the 2D image for each region. The term "regions" may indicate divided parts of the 2D image on which 360 video data are projected, and the regions may be partitioned depending on a projection scheme. The 2D image may be referred to as a video frame or a frame.

Regarding this, the present invention proposes metadata for the region-wise packing process depending on a projection scheme, and a method for signaling the metadata. The region-wise packing process may be performed more efficiently based on the metadata.

Figure 8:
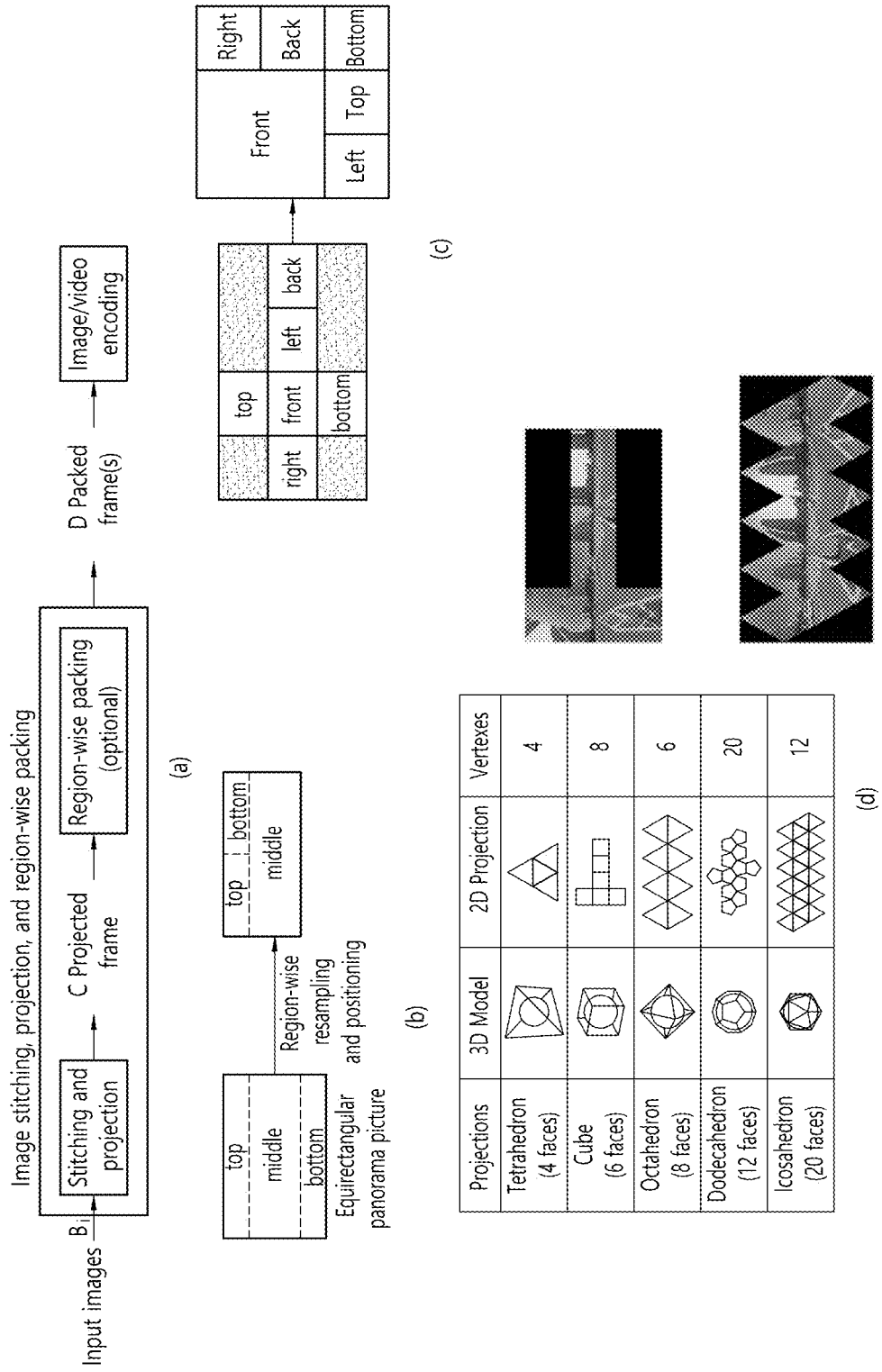
FIG. 8 exemplarily shows a two-dimension (2D) image having underwent 360-degree video processing process and a region-wise packing process depending on a projection format.

FIG. 8 exemplarily shows a 2D image having underwent 360 video processing process and a region-wise packing process depending on a projection format.

In FIG. 8, (a) may show a process of processing input 360 video. Referring to (a) of FIG. 8, input viewpoint-wise 360 video data may be stitched or projected on a 3D projection structure according to various projection schemes, and the 360e video data projected on the 3D projection structure may be expressed as a 2D image. That is, the 360 video data may be stitched, and may be projected as the 2D image. The 2D image, on which the 360 video is projected, may be expressed as a projected frame. In addition, the projected frame may undergo the aforementioned region-wise packing process. That is, a process of dividing an area including the projected 360 video data on the projected frame into regions, and rotating or rearranging each region or increasing or decreasing resolution of each region may be performed. In other words, the region-wise packing process may indicate a process of mapping the projected frame as one or more packed frames. The region-wise packing process may be optionally performed, and, if the region-wise packing process is not performed, the packed frame and the projected frame may be identical to each other. If the region-wise packing process is performed, each region of the projected frame may be mapped to the region of the packed frame, and it is possible to derive metadata that represents a position, a shape, and a size of a region of the packed frame to which each region of the projected frame is mapped.

In FIG. 8, (b) and (c) may show examples in which each region of the projected frame is mapped to a region of the packed frame. Referring to (b) of FIG. 8, the 360 video data may be projected on a 2D image (or frame) according to a panoramic projection scheme. The top region, the middle region, and the bottom region of the projected frame may undergo the region-wise packing process and hence rearranged as shown in the right drawing. Here, the top region may be a region representing the upper surface of the panorama on the 2D image, the middle region may be a region representing the middle surface of the panorama on the 2D image, and the bottom region may be a region representing the bottom surface of the panorama on the 2D image. In addition, referring to (c) of FIG. 8, the 360 video data may be projected on a 2D image (or frame) according to a cubic projection scheme. The front region, the back region, the top region, the bottom region, the right-side region, and the left-side region of the projected frame may undergo the region-wise packing process and hence rearranged as shown in the right drawing. Here, the front region may be a region representing the front surface of the cube on the 2D image, the back region may be a region representing the back surface of the cube on the 2D image. In addition, the top region may be a region representing an upper surface of the cube on the 2D image, and the bottom region may be a region representing the bottom surface of the cube on the 2D image. In addition, the right-side region may be a region representing the right-side surface of the cube on the 2D image, and the left-side region may be a region representing the left-side surface of the cube on the 2D image.

In FIG. 8, (d) may show various 3D projection formats into which the 360 video data can be projected. Referring to (d) of FIG. 8. The 3D projection formats may include a tetrahedron, a cube, a octahedron, a dodecahedron, and an icosahedron. The 2D projections shown in (d) of FIG. 8, may represent projected frames which represents the 360 video data projected into a 3D projection format on a 2D image.

The projection formats are merely exemplary, and, according to an embodiment, some or all of various projection formats (or projection schemes) may be used. A projection format used for 360 video may be indicated, for example, through a projection format field of metadata.

FIGS. 9A to 9B exemplarily show projection formats according to some embodiments of the present invention.

In FIG. 9A, (a) may show an equirectangular projection format. When the equirectangular projection format is used, a point (r, θ0, 0), that is, a point where θ=θ0 and φ=0, on a spherical surface and a central pixel on a 2D image may be mapped. A principal point of a front camera may be assumed to be a point (r, 0, 0) on the spherical surface. In addition, φ0=0 may be fixed. Therefore, a value (x, y) transformed into XY coordinate system may be transformed into a (X, Y) pixel on the 2D image through the following equation.

$$X = K_x * x + X_O = K_x * (\theta - \theta_0) * r + X_O$$

$$Y = -K_y * y - Y_O \quad \text{[Equation 1]}$$

In addition, if a left top pixel on the 2D image is positioned at (0, 0) in the XY system, an offset value for X axis and an offset value for Y axis may be represented by the following equation.

$$X_O = K_x * \pi * r$$

$$Y_O = -K_y * \pi/2 * r \quad \text{[Equation 2]}$$

Using the above, a transformation equation into the XY coordinate system may be as below.

$$X = K_x x + X_0 = K_x * (\pi + \theta - \theta_0) * r$$

$$Y = -K_y y - Y_O = K_y * (\pi/2 - \varphi) * r \quad \text{[Equation 3]}$$

For example, if θ0=0, that is, if a central pixel on a 2D image indicates data of θ=0 on a spherical surface, the spherical surface may be mapped to an area of a horizontal length (width)=2Kxπ and a vertical length (height)=Kxπr on the 2D image on the basis of (0,0). Data of φ=π/2 on the spherical surface may be mapped to the whole upper edge on the 2D image. In addition, data of (r, π/2, 0) on the spherical surface may be mapped to a point of (3πKxr/2, πKx r/2) on the 2D image.

At the reception side, 360 video data on the 2D image may be re-projected to the spherical surface. This may be represented by a transformation equation as below.

$$\theta = \theta_0 + X/K_x * r - \pi$$

$$\varphi = \pi/2 - Y/K_y * r \quad \text{[Equation 4]}$$

For example, a pixel at XY coordinates of (Kxπr, 0) on a 2D image may be re-projected to a point where θ=θ0 and φ=π/2 on a spherical surface.

In FIG. 9A, (b) may show a cubic projection format. For example, stitched 360 video data may appear on a spherical surface. The projection processor may project the 360 video data on a 2D image in the form of a cube. The 360 video data on the spherical surface may correspond to respective surfaces of the cube. As a result, the 360 video data may be projected on the 2D image, as shown in at the left side or the right side of (b) in FIG. 9A.

In FIG. 9A, (c) may show a cylindrical projection format. On the assumption that stitched 360 video data appear on a spherical surface, the projection processor may project the 360 video data on a 2D image in the form of a cylinder. The 360-degree video data on the spherical surface may correspond to the side, the top, and the bottom of the cylinder. As a result, the 360 video data may be projected on the 2D image, as shown in the left side or the right side of (c) in FIG. 9A.

In FIG. 9A, (d) may show a tile-based projection format. If the tile-based projection scheme is used, the aforementioned projection processor may divide 360 video data on a spherical surface into one or more sub-areas, as shown in (d) of FIG. 9A, and project on a 2D image. The sub-areas may be called tiles.

In FIG. 9B, (e) may show a pyramid projection format. On the assumption that stitched 360 video data appear on a spherical surface, the projection processor may regard the 360 video data as a pyramid and project the 360 video data on a 2D image in the form of a pyramid. The 360 video data on the spherical surface may correspond to four surfaces (the front, the left top, the left bottom, the right top, and the right bottom) of the pyramid. As a result, the 360-degree video data may be projected on the 2D image, as shown at the left side or the right side of (e) of FIG. 9B In this case, the bottom surface may be a region including data acquired by a camera that faces forward.

In FIG. 9B, (f) may show a panoramic projection format, If the panoramic projection format is used, the aforementioned projection processor may project only a side surface of 360 video data on a spherical surface on a 2D image, as shown in (f) of FIG. 9B. This may be the same as the case where the top and bottom surfaces do not exist in the cylindrical projection scheme.

Meanwhile, according to one embodiment, projection may be performed without a stitching process. In FIG. 9B, (g) may show the case where projection is performed without the stitching process. If projection is performed without the stitching process, the aforementioned projection processor may project 360 video data intact on a 2D image, as shown in (g) of FIG. 9B. In this case, a stitching process may be not performed, and intact images acquired by a camera may be projected on the 2D image.

Referring to (g) of FIG. 9B, two images may be projected on a 2D image without a stitching process. Each of the images may be a fish-eye image acquired by a spherical camera (or a fish-eye camera) through each sensor. As described above, at the reception side, image data acquired from camera sensors may be stitched, and the stitched image data may be mapped to a spherical surface to render spherical video, that is, 360 video.

Figure 10A:
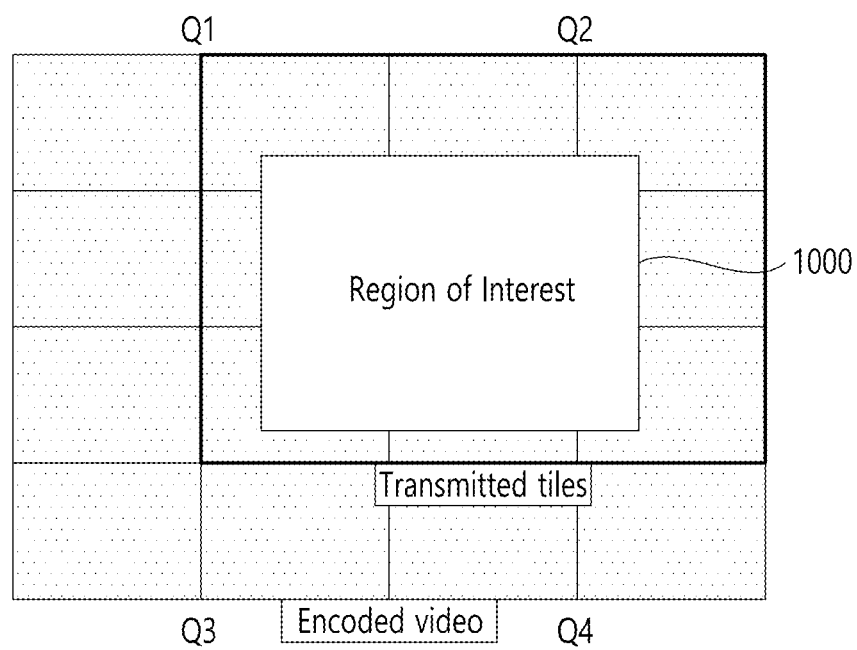
FIGS. 10A and 10B are diagrams showing tiles according to some embodiments of the present invention.
Figure 10B:
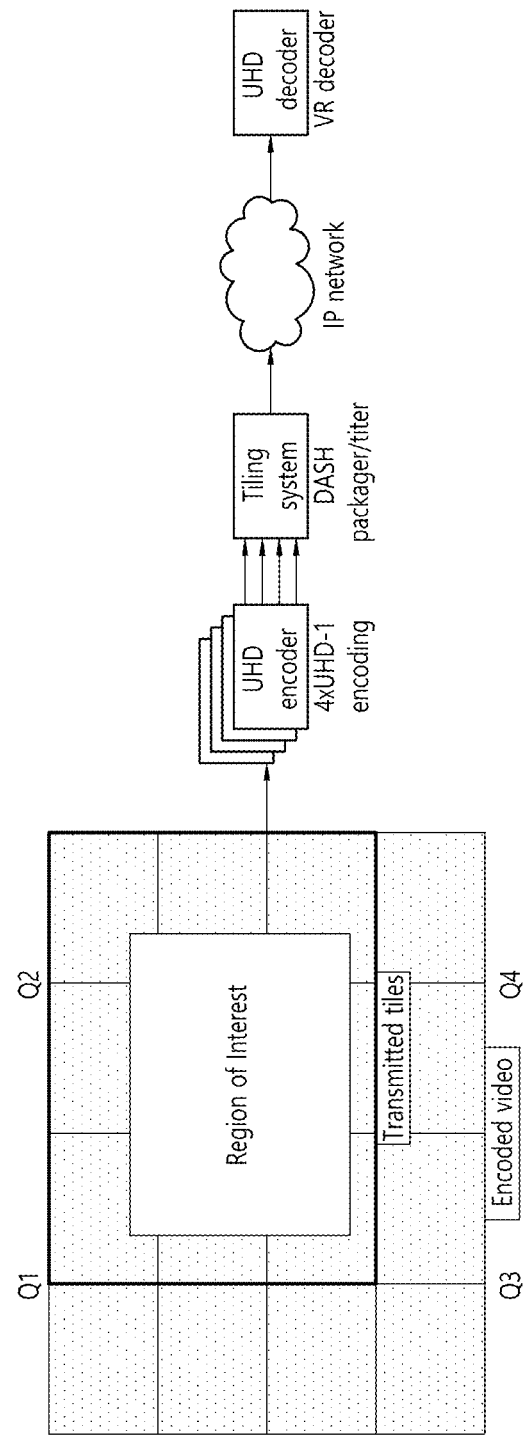

FIGS. 10A and 10B are diagrams showing tiles according to some embodiments of the present invention.

360 video data projected on a 2D image or 360 video data having undergone a region-wise packing process may be partitioned into one or more tiles. FIG. 10A shows the case where one 2D image is partitioned into 16 tiles. Here, a 2D image may be the aforementioned projected frame or packed frame. According to another embodiment of a 360 video transmission apparatus of the present invention, the data encoder is able to encode the respective tiles independently.

Region-wise packing and tiling may be different from each other. Region-wise packing may be processing each region of the 360 video data projected on the 2D image in order to improve coding efficiency or to adjust resolution. Tiling may be dividing, the data encoder, the projected frame or the packed frame into tiles and independently encoding the tiles. When the 360 video data are provided, the user does not simultaneously enjoy all parts of the 360 video data. Tiling may enable the reception side to enjoy or receive only tiles corresponding to an important part or a predetermined part, such as the viewport that is being viewed by the user, to the reception side within a limited bandwidth. The limited bandwidth may be more efficiently utilized through tiling, and calculation load for the reception side may be reduced compared to the case of processing the entire 360 video data all at once.

Since the regions and the tiles are different from each other, the two areas are not necessarily the same. In some embodiments, however, the regions and the tiles may indicate the same areas. In some embodiments, region-wise packing may be performed based on the tiles, whereby the regions and the tiles may become the same. Also, in some embodiments, in the case where the surfaces according to the projection scheme and the regions are the same, the surface according to the projection scheme, the regions, and the tiles may indicate the same areas. Depending on the context, the regions may be called VR regions, and the tiles may be called tile regions.

A region of interest (ROI) may be an area in which users are interested, proposed by a 360 content provider. The 360 content provider may produce a 360 video in consideration of the area of the 360 video in which users are expected to be interested. In some embodiments, the ROI may correspond to an area of the 360 video in which an important portion of the 360-degree video is shown.

In another embodiment of the 360 video transmission/reception apparatus according to the present invention, the reception-side feedback-processing unit may extract and collect viewport information, and may deliver the same to the transmission-side feedback-processing unit. At this process, the viewport information may be delivered using the network interfaces of both sides. FIG. 10A shows a viewport t6010 displayed on the 2D image. Here, the viewport may be located over 9 tiles on the 2D image.

In this case, the 360 video transmission apparatus may further include a tiling system. In some embodiments, the tiling system may be disposed after the data encoder (see FIG. 10B), may be included in the data encoder or the transmission-processing unit, or may be included in the 360 video transmission apparatus as a separate internal/external element.

The tiling system may receive the viewport information from the transmission-side feedback-processing unit. The tiling system may select and transmit only tiles including the viewport area. In the FIG. 10A, 9 tiles including the viewport area 1000, among a total of 16 tiles of the 2D image, may be transmitted. Here, the tiling system may transmit the tiles in a unicast manner over a broadband connection. It is because the viewport area varies depending on a user.

Also, in this case, the transmission-side feedback-processing unit may deliver the viewport information to the data encoder. The data encoder may encode the tiles including the viewport area at higher quality than other tiles.

Also, in this case, the transmission-side feedback-processing unit may deliver the viewport information to the metadata-processing unit. The metadata-processing unit may deliver metadata for the viewport area to the internal elements of the 360 video transmission apparatus, or may include the same in the 360-video related metadata.

By using this tiling method, it is possible to save transmission bandwidth and to differently perform processing for each tile, whereby efficient data processing/transmission is possible.

Embodiments related to the viewport area may be similarly applied to specific areas other than the viewport area. For example, processing performed on the viewport area may be equally performed on an area in which users are determined to be interested through the gaze analysis, ROI, and an area that is reproduced first when a user views the 360 video through the VR display (initial viewport).

According to another embodiment of the 360 video transmission apparatus, the transmission-processing unit may perform transmission processing differently for respective tiles. The transmission-processing unit may apply different transport parameters (modulation order, code rate, etc.) to the tiles such that robustness of data delivered for each region is changed.

At this point, the transmission-side feedback-processing unit may deliver the feedback information, received from the 360 video reception apparatus, to the transmission-processing unit, which may perform transmission processing differently for respective tiles. For example, the transmission-side feedback-processing unit may deliver the viewport information, received from the reception side, to the transmission-processing unit. The transmission-processing unit may perform transmission processing on tiles including the viewport area so as to have higher robustness than for the other tiles.

FIG. 11 is a view showing 360-degree-video related metadata according to an embodiment of the present invention.

The 360-degree-video related metadata may include various metadata for the 360-degree video. Depending on the context, the 360-degree-video related metadata may be called 360-degree-video-related signaling information. The 360-degree-video related metadata may be transmitted while being included in a separate signaling table, or may be transmitted while being included in DASH MPD, or may be transmitted while being included in the form of a box in a file format of ISOBMFF. In the case where the 360-degree-video related metadata are included in the form of a box, the metadata may be included in a variety of levels, such as a file, a fragment, a track, a sample entry, and a sample, and may include metadata related to data of a corresponding level.

In some embodiments, a portion of the metadata, a description of which will follow, may be transmitted while being configured in the form of a signaling table, and the remaining portion of the metadata may be included in the form of a box or a track in a file format.

According to an embodiment of the 360-degree-video related metadata, the 360-degree-video related metadata may include basic metadata about projection schemes, stereoscopy related metadata, initial-view/initial-viewport related metadata, ROI related metadata, field-of-view (FOV) related metadata, and/or cropped-region related metadata. In some embodiments, the 360-degree-video related metadata may further include metadata other than the above metadata.

Embodiments of the 360-degree-video related metadata according to the present invention may include at least one of the basic metadata, the stereoscopy related metadata, the initial-view related metadata, the ROI related metadata, the FOV related metadata, the cropped-region related metadata, and/or additional possible metadata. Embodiments of the 360-degree-video related metadata according to the present invention may be variously configured depending on possible number of metadata included therein. In some embodiments, the 360-degree-video related metadata may further include additional information.

The stereo_mode field may indicate a 3D layout supported by the 360-degree video. It is possible to indicate whether the 360-degree video supports 3D using only this field. In this case, the is_stereoscopic field may be omitted. When the field has a value of 0, the 360-degree video may have a mono mode. That is, the 2D image, on which the 360-degree video is projected, may include only one mono view. In this case, the 360-degree video may not support 3D.

When the field has a value of 1 or 2, the 360-degree video may follow a left-right layout or a top-bottom layout. The left-right layout and the top-bottom layout may be called a side-by-side format and a top-bottom format, respectively. In the left-right layout, 2D images on which a left image/a right image are projected may be located at the left/right side on an image frame. In the top-bottom layout, 2D images on which a left image/a right image are projected may be located at the top/bottom side on the image frame. In the case where the field has additional values, the values may be reserved for future use.

The initial-view related metadata may include information about the time at which a user views the 360-degree video when the 360-degree video is reproduced first (an initial viewport). The initial-view related metadata may include an initial_view_yaw_degree field, an initial_view_pitch_degree field, and/or an initial_view_roll_degree field. In some embodiments, the initial-view related metadata may further include additional information.

The initial_view_yaw_degree field, the initial_view_pitch_degree field, and the initial_view_roll_degree field may indicate an initial viewport when the 360-degree video is reproduced. That is, the very center point of the viewport that is viewed first at the time of reproduction may be indicated by these three fields. Specifically, the initial_view_yaw_degree field may indicate a yaw value at the initial viewpoint. That is, the initial_view_yaw_degree field may indicate the rotational direction (symbol) and the extent of rotation direction (angle) in which the position of the very center point is rotated about the yaw axis. In addition, the initial_view_pitch_degree field may indicate a pitch value at the initial viewpoint. That is, the initial_view_pitch_degree field may indicate the rotational direction (symbol) and the extent of rotation (angle) in which the position of the very center point is rotated about the pitch axis. In addition, the initial_view_roll_degree field may indicate a roll value at the initial viewpoint. That is, the initial_view_roll_degree field may indicate the rotational direction (symbol) and the extent of rotation (angle) in which the position of the very center point is rotated about the roll axis. The initial viewpoint at the time of reproduction of the corresponding 360-degree video, that is, the very center point of the view point that is viewed first at the time of reproduction may be indicated based on the initial_view_yaw_degree field, the initial_view_pitch_degree field, and the initial_view_roll-_degree field. In doing so, a specific area of the 360-degree video may be displayed at the initial viewpoint for a user. In addition, the horizontal length and the vertical length (width and height) of an initial viewport based on the indicated initial viewport through the FOV may be determined. That is, the 360-degree video reception apparatus may provide a user with a predetermined area of the 360-degree video as an initial viewport using these three fields and the FOV information.

In some embodiments, the initial viewport indicated by the initial-view related metadata may be changed for each scene. That is, the scenes of the 360-degree video may be changed over time of 360 content. An initial viewport or an initial viewport at which the user views the video first may be changed for every scene of the 360-degree video. In this case, the initial-view related metadata may indicate the initial viewport for each scene. To this end, the initial-view related metadata may further include a scene identifier identifying the scene to which the initial viewport is applied. In addition, the FOV may be changed for each scene. The initial-view related metadata may further include scene-wise FOV information indicating the FOV corresponding to the scene.

The ROI related metadata may include information related to the ROI. The ROI related metadata may a 2d_roi_range_flag field and/or a 3d_roi_range_flag field. Each of the two fields may indicate whether the ROI related metadata includes fields expressing the ROI based on the 2D image or whether the ROI related metadata includes fields expressing the ROI based on the 3D space. In some embodiments, the ROI related metadata may further include additional information, such as differential encoding information based on the ROI and differential transmission processing information based on the ROI.

In the case where the ROI related metadata includes fields expressing the ROI based on the 2D image, the ROI related metadata may include a min_top_left_x field, a max_top_left_x field, a min_top_left_y field, a max_top_left_y field, a min_width field, a max_width field, a min_height field, a max_height field, a min_x field, a max_x field, a min_y field, and/or a max_y field.

The min_top_left_x field, the max_top_left_x field, the min_top_left_y field, and the max_top_left_y field may indicate the minimum/maximum values of the coordinates of the left top end of the ROI. That is, these fields may indicate the minimum x coordinate, the maximum x coordinate, the minimum y coordinate, and the maximum y coordinate of the left top end, respectively.

The min_width field, the max_width field, the min_height field, and the max_height field may indicate the minimum/maximum values of the horizontal size (width) and the vertical size (height) of the ROI. That is, these fields may indicate the minimum value of the horizontal size, the maximum value of the horizontal size, the minimum value of the vertical size, and the maximum value of the vertical size, respectively.

The min_x field, the max_x field, the min_y field, and the max_y field may indicate the minimum/maximum values of the coordinates in the ROI. That is, these fields may indicate the minimum x coordinate, the maximum x coordinate, the minimum y coordinate, and the maximum y coordinate of the coordinates in the ROI, respectively. These fields may be omitted.

In the case where the ROI related metadata includes fields expressing the ROI based on the coordinates in the 3D rendering space, the ROI related metadata may include a min_yaw field, a max_yaw field, a min_pitch field, a max_pitch field, a min_roll field, a max_roll field, a min_field_of_view field, and/or a max_field_of_view field.

The min_yaw field, the max_yaw field, the min_pitch field, the max_pitch field, the min_roll field, and the max_roll field may indicate the area that the ROI occupies in 3D space as the minimum/maximum values of yaw, pitch, and roll. That is, these fields may indicate the minimum value of the amount of rotation about the yaw axis, the maximum value of the amount of rotation about the yaw axis, the minimum value of the amount of rotation about the pitch axis, the maximum value of the amount of rotation about the pitch axis, the minimum value of the amount of rotation about the roll axis, and the maximum value of the amount of rotation about the roll axis, respectively.

The min_field_of_view field and the max_field_of_view field may indicate the minimum/maximum values of the FOV of the 360-degree video data. The FOV may be a range of vision within which the 360-degree video is displayed at once when the video is reproduced. The min_field_of_view field and the max_field_of_view field may indicate the minimum value and the maximum value of the FOV, respectively. These fields may be omitted. These fields may be included in FOV related metadata, a description of which will follow.

The FOV related metadata may include the above information related to the FOV. The FOV related metadata may include a content_fov_flag field and/or a content_fov field. In some embodiments, the FOV related metadata may further include additional information, such as information related to the minimum/maximum values of the FOV.

The content_fov_flag field may indicate whether information about the FOV of the 360-degree video intended at the time of production exists. When the value of this field is 1, the content_fov field may exist.

The content_fov field may indicate information about the FOV of the 360 video intended at the time of production. In some embodiments, the portion of the 360-degree video that is displayed to a user at once may be determined based on the vertical or horizontal FOV of the 360-degree video reception apparatus. Alternatively, in some embodiments, the portion of the 360-degree video that is displayed to the user at once may be determined in consideration of the FOV information of this field.

The cropped-region related metadata may include information about the area of an image frame that includes actual 360-degree video data. The image frame may include an active video area, in which actual 360-degree video data is projected, and an inactive video area. Here, the active video area may be called a cropped area or a default display area. The active video area is an area that is seen as the 360-degree video in an actual VR display. The 360-degree video reception apparatus or the VR display may process/display only the active video area. For example, in the case where the aspect ratio of the image frame is 4:3, only the remaining area of the image frame, excluding a portion of the upper part and a portion of the lower part of the image frame, may include the 360-degree video data. The remaining area of the image frame may be the active video area.

The cropped-region related metadata may include an is_cropped_region field, a cr_region_left_top_x field, a cr_region_left_top_y field, a cr_region_width field, and/or a cr_region_height field. In some embodiments, the cropped-region related metadata may further include additional information.

The is_cropped_region field may be a flag indicating whether the entire area of the image frame is used by the 360-degree video reception apparatus or the VR display. Here, an area to which 360-video data is mapped or an area seen on the VR display may be called an active video area. This field may indicate whether the entire image frame is the active video area. In the case where only a portion of the image frame is the active video area, the following four fields may be further included.

The cr_region_left_top_x field, the cr_region_left_top_y field, the cr_region_width field, and the cr_region_height field may indicate the active video area in the image frame. These fields may indicate the x coordinate of the left top of the active video area, the y coordinate of the left top of the active video area, the horizontal length (width) of the active video area, and the vertical length (height) of the active video area, respectively. The horizontal length and the vertical length may be expressed using pixels.

The 360-video-based VR system may provide a user with visual/audible experience in a different viewing orientation from a position of the user with respect to 360 video based on the above-described 360 video processing. The VR system, which provides a user with visual/audible experience in different viewing orientation from a fixed position of the user with respect to 360 video, may be called a three degree of freedom (3DoF)-based VR system. Meanwhile, the VR system capable of providing visual/audible experience in different viewing orientations from different viewing positions at different viewpoints may be called a 3DoF+ or 3DoF plus-based VR system.

FIG. 12 schematically shows concepts of a view point, a viewing position, and a viewing orientation.

Referring to FIG. 12, on the assumption of a space (e.g., a theater) as in (a), each marked circle may indicate a different view point. An image/voice provided at each view point in the same space may be associated with each other in the same time zone. In this case, different visual/audible experience may be provided to a user depending on a change in a gaze direction (e.g., head motion) of the user at a specific viewpoint. That is, a sphere of various viewing positions at a specific viewpoint may be assumed, as shown in (b), and image/voice/text information which has taken into consideration of a relative location of each viewing position may be provided.

Meanwhile, as shown in (c), visual/audible information from various directions as in legacy 3DoF may be delivered from a specific viewing position at a specific viewpoint. At this point, not just a main source (e.g., an image/voice/text) but also other various sources combined with the main source may be provided, and, in this case, information associated with or independent of a user's viewing orientation may be delivered.

Figure 13:
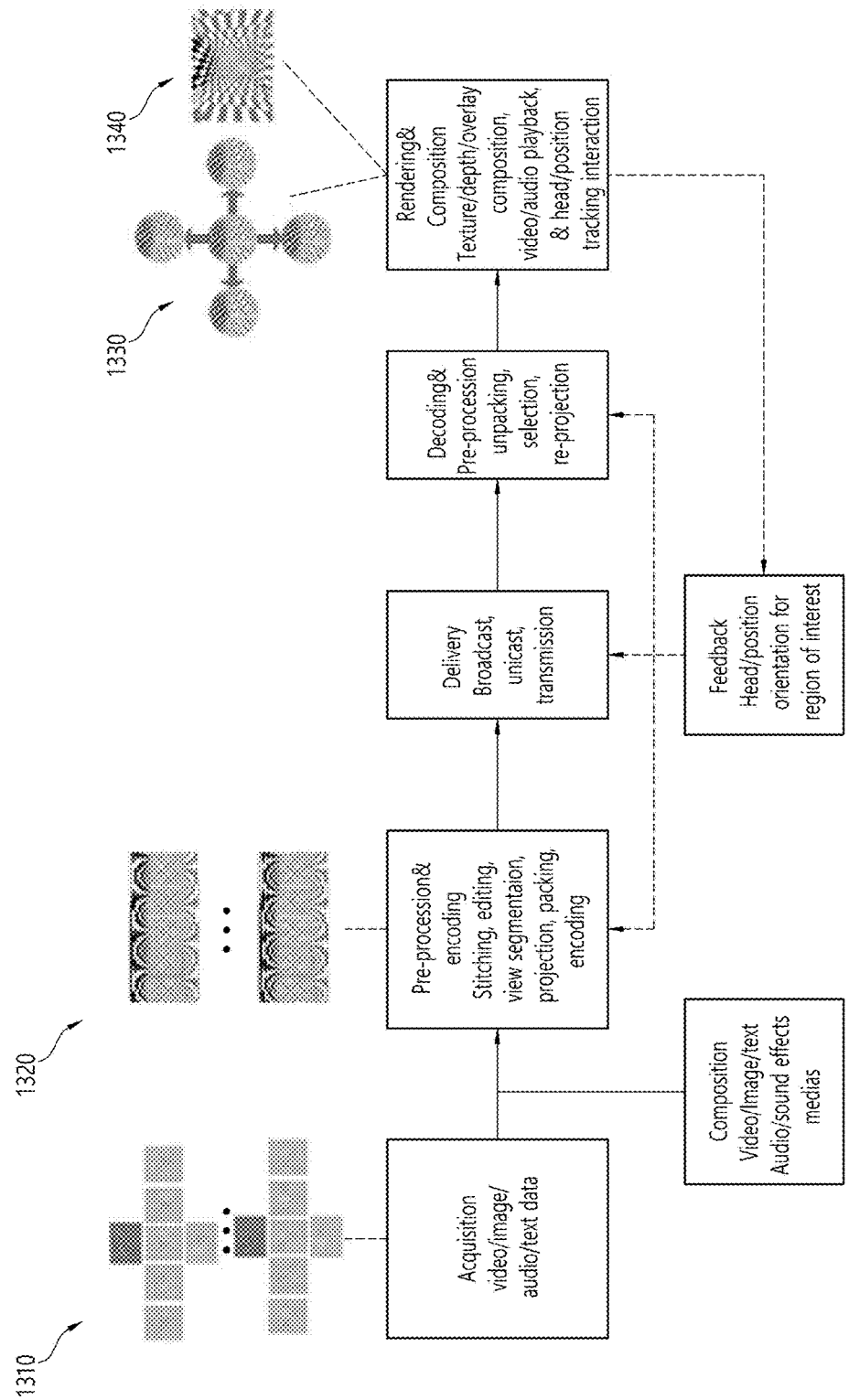
FIG. 13 is a diagram schematically showing an example of architecture for providing 3DoF+ video according to an embodiment of the present invention.

FIG. 13 is a diagram schematically showing an example of architecture for providing 3DoF+ video according to an embodiment of the present invention.

FIG. 13 may show a flowchart of a 3DoF+ end-to-end system including an acquisition process, a pre-processing process, a transmission process, a (post-)processing process, a rendering process, and a feedback process of 3DoF+.

Referring to FIG. 13, the acquisition process may refer to a process of acquiring 360 video through capturing, composition, or generating the 360 video. Through the acquisition process, a plurality of image/voice information items may be acquired according to change of a viewing direction (e.g., a head motion) for a plurality of positions. In this case, the image may include not just visual information (e.g., texture) but also depth information. In this case, as shown in an example of image information indicated by reference numeral 1310, a plurality of information items for different viewing positions with different viewpoints may be acquired.

The composition process may a procedure and a method for performing composition in order to include, user experience, not just information acquired by an image/voice input device, but also an image (video/image, etc.), a voice (audio/sound effect, etc.), a text (subtitle, etc.) from an external media.

The pre-processing process is a process of preparing (pre-processing) transmission/delivery of acquired 360 video, and may include the above-described stitching, projection, region-wise packing, and/or encoding processes. That is, the pre-processing process may include a pre-processing process and an encoding process to change/make up for data of image/voice/text information according to intention of a person who made the information. For example, the process of pre-processing an image may include: a step of mapping (stitching) acquired visual information on a 360 sphere; a step of performing calibration (editing) to remove a region boundary, reduce difference in color/brightness, or apply visual effects to an image; a (view segmentation) step of segmenting an image by viewpoints; a (projection) step of mapping an image on a 360 sphere into a 2D image; a (region-wise packing) step of performing region-wise packing of an image; and a step of encoding image information. As shown in an example of a video side indicated by reference numeral 1320, a plurality of projection images from different viewing positions according to different viewpoints may be generated.

The transmission process may refer to a process of processing and transmitting image/voice data and metadata having undergone a preparation process (a pre-processing process). In order to deliver a plurality of items of image/voice data from different viewing positions according to different viewpoints and metadata related thereto, a communication network may be used or a unidirectional transmission may be utilized, as described above.

The post-processing and composition processes may refer to a post-processing process for decoding received/stored video/audio/text data and reproduce the same. For example, the post-processing process may include an unpacking process of unpacking packed images, and a re-projection process of restoring a 2D projected image into a 3D spherical image.

The rendering process may refer to a process of rendering image/video data re-projected in a 3D space and display the rendered data. In this course, an image/voice signal may be reconfigured into a form suitable to be output. It is possible to track a viewing orientation in which a region of interest for a user is present, a viewing position/head position of the ROI, and a view point of the ROI, and necessary image/voice/text information only may be selectively used based on the information. In this case, an image signal may be selected with a different viewing position according to a user's ROI, and, as a result, an image of a specific direction from a specific viewing position at a specific viewpoint may be output.

Figure 14A:
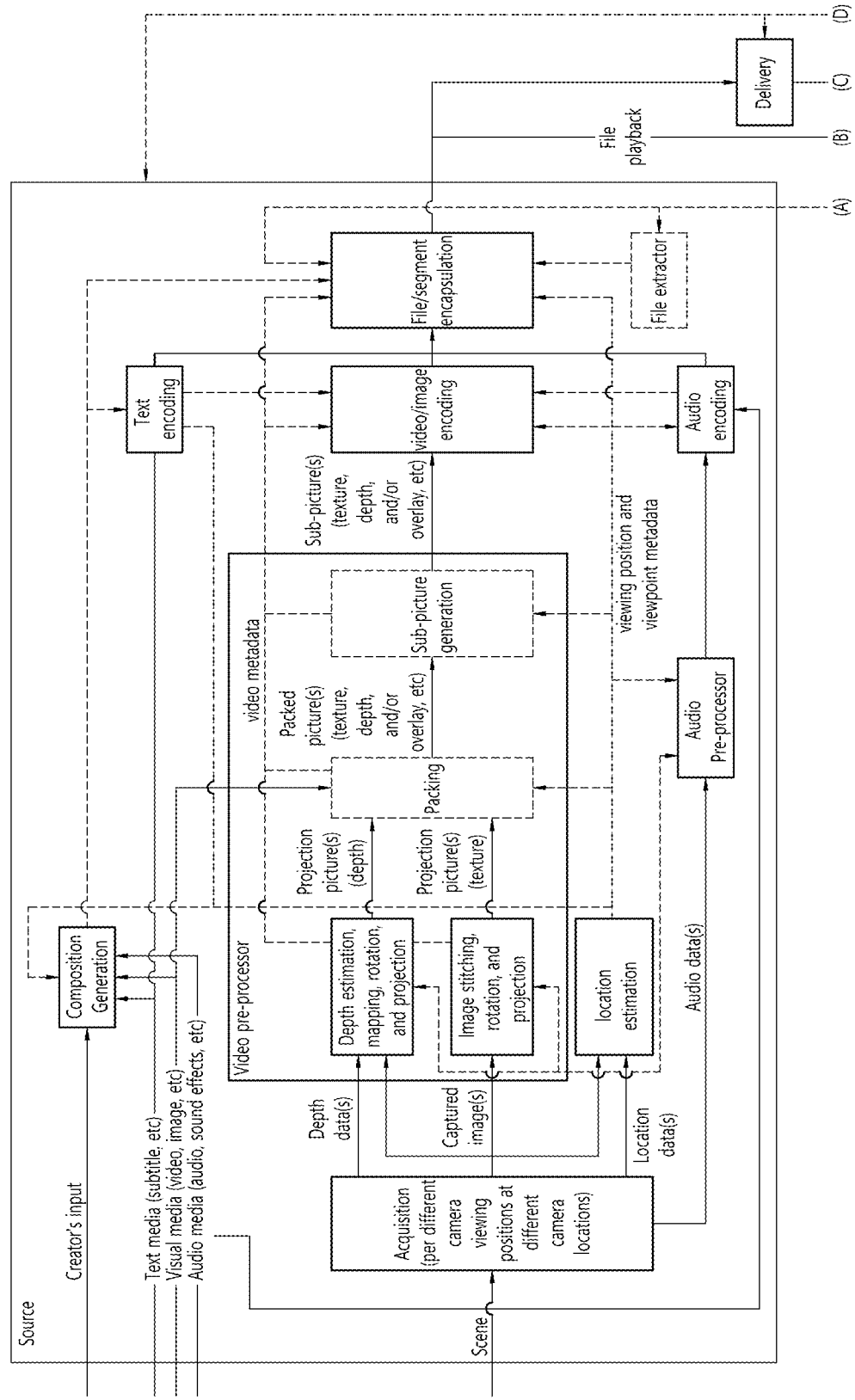
FIGS. 14A and 14B are diagrams showing an example of architecture of a three Degrees of Freedom Plus (3DoF+) end-to-end system.
Figure 14B:
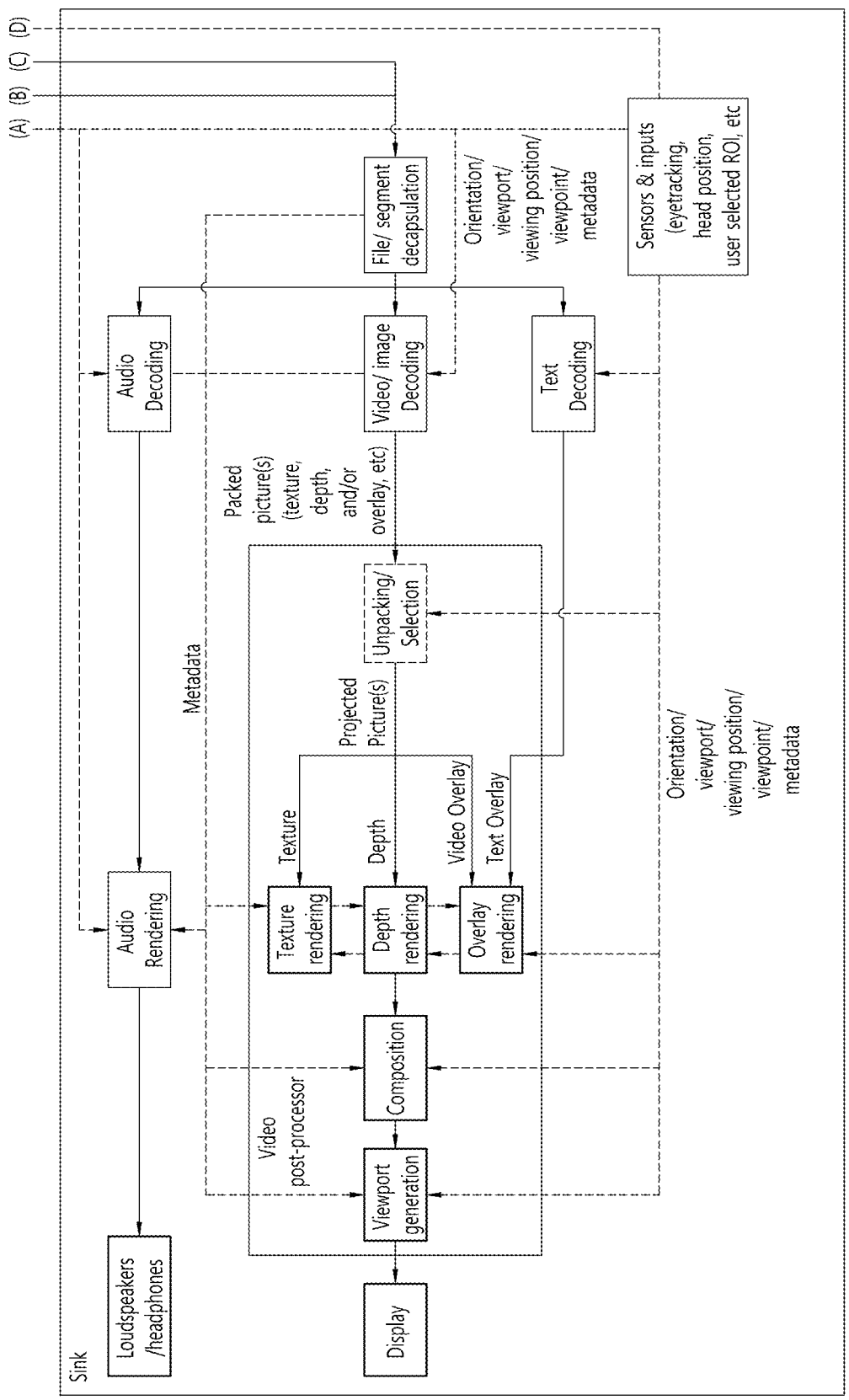

FIGS. 14A and 14B are an example of architecture of a 3DoF+ end-to-end system.

According to the architecture shown in FIGS. 14A and 14B, the above-described 3DoF+ 360 content may be provided.

Referring to FIG. 14A, a 360 video transmission apparatus (transmission point) may be composed largely of: a part (an acquisition unit) for acquiring 360 video (image)/audio data; a part (a video/audio pre-processor) for processing the acquired data; a part (a composition generation unit) for compositing additional information; a part (an encoding unit) for encoding text, audio, and projected 360 video; and a part (an encapsulation unit) for encapsulating the encoded data. As described above, the encoded data may be output in a bitstream form, and the encoded data may be encapsulated into a file format such as ISOBMFF and CFF or may be processed into the form of other DASH segment or the like. The encoded data may be delivered to a 360 video reception apparatus through a digital storage medium, or, although explicitly illustrated, the encoded data may undergo a process necessary for transmission by a transmission processor, as described above, and then transmitted through a broadcast network or a broadband.

In the data acquisition part, different information items may be acquired simultaneously or continuously according to a sensor orientation (a viewing orientation in an image), a sensor position (or a viewing position in an image), and a location at which a sensor acquires information (or a viewpoint in an image), and, in this case, video, image, audio, viewpoint information, etc. may be acquired.

In the case of image data, texture information and depth information may be acquired, and different video pre-processing may be performed according to characteristics of each component. For example, in the case of texture information, a 360 omnidirectional image may be constructed using images of different viewing orientations from the same viewing position at the same viewpoint based on image sensor viewpoint information, and, to this end, a stitching process may be performed. In addition, projection and/or region-wise packing may be performed to change an image to a format to be encoded. For example, a depth image may be acquired usually by a depth camera, and, in this case, the depth image may be made in the form of texture. Alternatively, depth data may be generated based on additionally measured data. After each component image is generated, additional conversion (packing) is performed on a corresponding component into a video format for efficient compression or sub-picture generation is performed to reconfigure a corresponding component into actually necessary portions by partitioning the same. Information on image configuration used in a video pre-processing step is delivered through video metadata.

In the case where image/voice/text information given in addition to acquired data (or data to be primarily serviced) is provided, it is necessary to provide information to composite the information and the data at a final reproduction time. The composition generation unit generates information, which is used to composite externally generated media data (video/image for an image, audio/effect sound for a voice, subtitle for a text, etc.) at a final reproduction step, according to intention of a producer, and the generated information is delivered through composition metadata.

Image/voice/text information having underwent respective corresponding processes is compressed using corresponding respective encoders, and encapsulated by an application on the basis of a file/or segment unit. In this case, according to a file or segment configuration method, it is possible to extract only necessary information (by a file extractor).

In addition, information necessary to reconfigure each data in a receiver is delivered on a codec level or a file format/system level, and, in this case, the data includes video/audio metadata for reconfiguring video/audio, composition metadata for overlay, viewing position and viewpoint metadata on video/audio reproduction-allowed viewpoints and a viewing position dependent on each viewpoint, etc. Such information may be processed by an additional metadata processor.

Referring to FIG. 14B, a 360 video reception apparatus (a reception point) may be composed largely of: a part (a file/segment decapsulation unit) for decapsulating a received file or segment; a part (a decoding unit) for generating image/voice/text information based on a bit stream; a part (a post-processor) for reconfiguring image/voice text; a part (a tracking unit) for tracking a user's ROI; and a display which is a display device.

Bit streams generated through decapsulation may be partitioned into image/voice/text according to a type of data and then individually decoded into a reproducible format.

In the tracking part, information on a viewpoint of a user's ROI, a viewing position at the corresponding viewpoint, and a viewing orientation from the corresponding viewing position may be generated based on information of a sensor and information of a user input, and the generated information may be used to select or extract the ROI in each module of the 360 video reception apparatus or to perform post-processing to highlight the ROI. In addition, if the generated information is delivered to a 360 video transmission apparatus, the generated information may be used in various image reconfiguration methods (viewport/viewing position/ viewpoint dependent processing) for efficient bandwidth use.

A method for processing a decoded image signal may vary according to any of various processing methods depending on an image configuration method. When image packing is performed in the 360 video transmission apparatus, a process of reconfiguring an image based on information delivered through metadata is necessary. In this case, video metadata generated by the 360 video transmission apparatus may be used. In addition, in the case where the decoded image includes images of multiple-viewpoints, multiple viewing positions, or multiple viewing orientations, information matching with a viewpoint, a viewing position, or viewing orientation of a user's ROI generated through tracking may be selected and processed. In this case, viewing position and viewpoint related metadata generated by the transmission point may be used. In addition, in the case where multiple components are delivered with respect to a specific viewpoint, viewing position, or viewing orientation or video information for overlay is delivered additionally, a rendering process for respective corresponding information may be included. Video data (texture, depth, overlay) having gone through the additional rendering process goes through a composition process, and, in this case, composition metadata generated by the transmission point may be used. As a result, information necessary to reproduce a viewport according to the user's ROI may be generated.

A decoded voice signal is used to generate a voice signal through an audio renderer and/or post-processing. In this case, information matching with the user's demand may be generated based on information on a user's ROI and metadata delivered to the 360 video reception apparatus.

A decoded text signal may be delivered to an overlay renderer to be processed into text-based overlay information such as subtitle. If necessary, an additional text post-processing process may be included.

Figure 15:
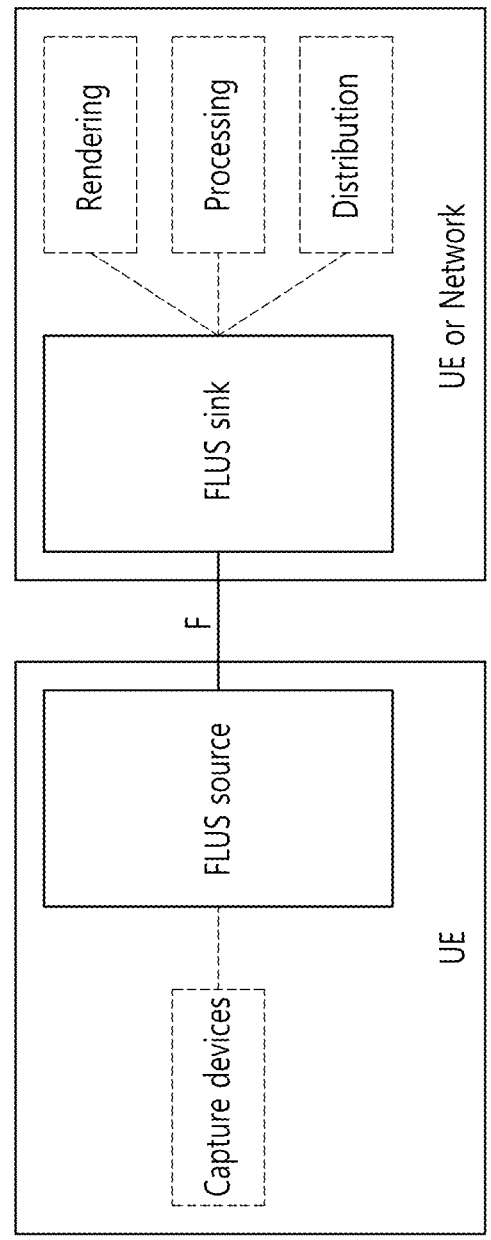
FIG. 15 is a diagram schematically showing an example of Framework for Live Uplink Streaming (FLUS) architecture.

FIG. 15 is a diagram schematically showing examples of FLUS architecture.

FIG. 15 shows an example in which a User Equipment (UE) or another UE or a network perform communication a wireless communication system based on Framework for Live Uplink Streaming (FLUS). An FLUS source and an FLUS sink may transmit and receive data to and from each other using an F reference point.

In the present specification, an "FLUS source" may indicate an apparatus that transmits data to a FLUS sink through the F reference point based on FLUS. However, the FLUS source does not always transmit data to a FLUS sink, and, in some cases, the FLUS source may receive data from the FLUS sink through the F reference point. The FLUS source may be construed to be identical/similar to an image transmission apparatus or 360 video transmission apparatus disclosed throughout the present specification, to include the image transmission apparatus or 360 video transmission apparatus, or to be included in the image transmission apparatus or 360 video transmission apparatus. The FLUS source may be a UE, a network, a server, a cloud server, a Set Top Box (STB), a base station, a PC, a desktop, a laptop, a camera, a camcorder, a TV, and the like and may be an component or module included in the exemplary apparatuses, and furthermore apparatuses similar to the exemplary apparatuses may operate as FLUS sources. Examples of the FLUS source are not limited thereto.

In the present specification, an "FLUS sink" may indicate an apparatus that receives data from an FLUS sink through a F reference point based on FLUS. However, the FLUS source does not always receive data from the FLUS sink, and, in some cases, the FLUS sink may transmit data to the FLUS sink through the F reference point. The FLUS sink may be construed to be identical/similar to an image reception apparatus or 360 video reception apparatus disclosed throughout the present specification, to include the image reception apparatus or 360 video reception apparatus, or to be included in the image reception apparatus or 360 video reception apparatus. The FLUS sink may be a UE, a network, a server, a cloud server, a Set Top Box (STB), a base station, a PC, a desktop, a laptop, a camera, a camcorder, a TV, and the like and may be an component or module included in the exemplary apparatuses, and furthermore apparatuses similar to the exemplary apparatuses may operate as FLUS sinks. Examples of the FLUS sink are not limited thereto.

Referring to FIG. 15, it is illustrated that an FLUS source and capture devices compose one UE, but exemplary embodiments of the present invention are not limited thereto. The FLUS source may include capture devices, and the FLUS source itself including the capture devices may be a UE. Alternatively, the capture devices may be not included in the UE and may transmit media information to a UE. The number of capture devices may be one or more.

Referring to FIG. 15, it is illustrated that an FLUS sink, a rendering module (or unit), a processing module (or unit), and a distribution module (or unit) compose one UE or network, but exemplary embodiments of the present invention are not limited thereto. The FLUS sink may include at least one of the rendering module, the processing module, or the distribution module, and the FLUS sink itself including the rendering module, the processing module, and the distribution module may be a UE or network. Alternatively, at least one of the rendering module, the processing module, or the distribution module may be not included in a UE or network, and the FLUS sink may transmit media information to at least one of the rendering module, the processing module, or the distribution module. The number of rendering modules, the number of processing modules, and the number of distribution modules may be at least one, and, in some cases, some of them may not exist.

In one example, the FLUS sink may operate as a Media Gateway Function (MGW) and/or an Application Function (AF).

In FIG. 15, the F reference point connecting the FLUS source and the FLUS sink may allow the FLUS source to establish and control a single FLUS session. In addition, the F reference point may enable the FLUS sink to authenticate and authorize the FLUS source. In addition, the F reference point may support a function of protecting security of the FLUS control plane (F-C) and the FLUS user plane (F-U).

In one embodiment, each of the FLUS source and the FLUS sink may include an FLUS ctrl module, and the respective FLUS ctrl modules of the FLUS source and the FLUs sink may be connected through the F-C. The FLUS ctrl module and the F-C may provide a function of performing downstream distribution on a media in which the FLUs sink is uploaded, provide media instantiation selection, and support configuration of static metadata for a session. In one example, when the FLUS sink is only capable of rendering, the F-C may not exist.

In one embodiment, the F-C may be used to establish and control an FLUS session. The F-C may be used to allow the FLUS source to select a FLUS media instantiation such as MTSI, provide static metadata associated with a media session, and select and configure the processing and distribution functions.

The FLUS media instance may be defined as part of the FLUS session. The F-U may, in some cases, contain media stream establishment procedures, and a plurality of media streams may be generated for one FLUS session.

A media stream may include a media components of a single content type such as audio, video, and text, and may include media components of different content types such as audio and video. The FLUS session may be composed of a plurality of identical content types. For example, the FLUS session may be composed of a plurality of media streams for video.

In addition, in one embodiment, each of the FLUS source and the FLUS sink may include an FLUS media module, and the respective FLUS media modules of the FLUS source and the FLUs sink may be connected through the F-U. The FLUS media module and the F-U may provide a function of generating one or more media sessions and a function of transmitting media data through a media stream. In some cases, a media session establishment protocol (e.g., IMS session set-up for MTSI-based FLUS).

Figure 16:
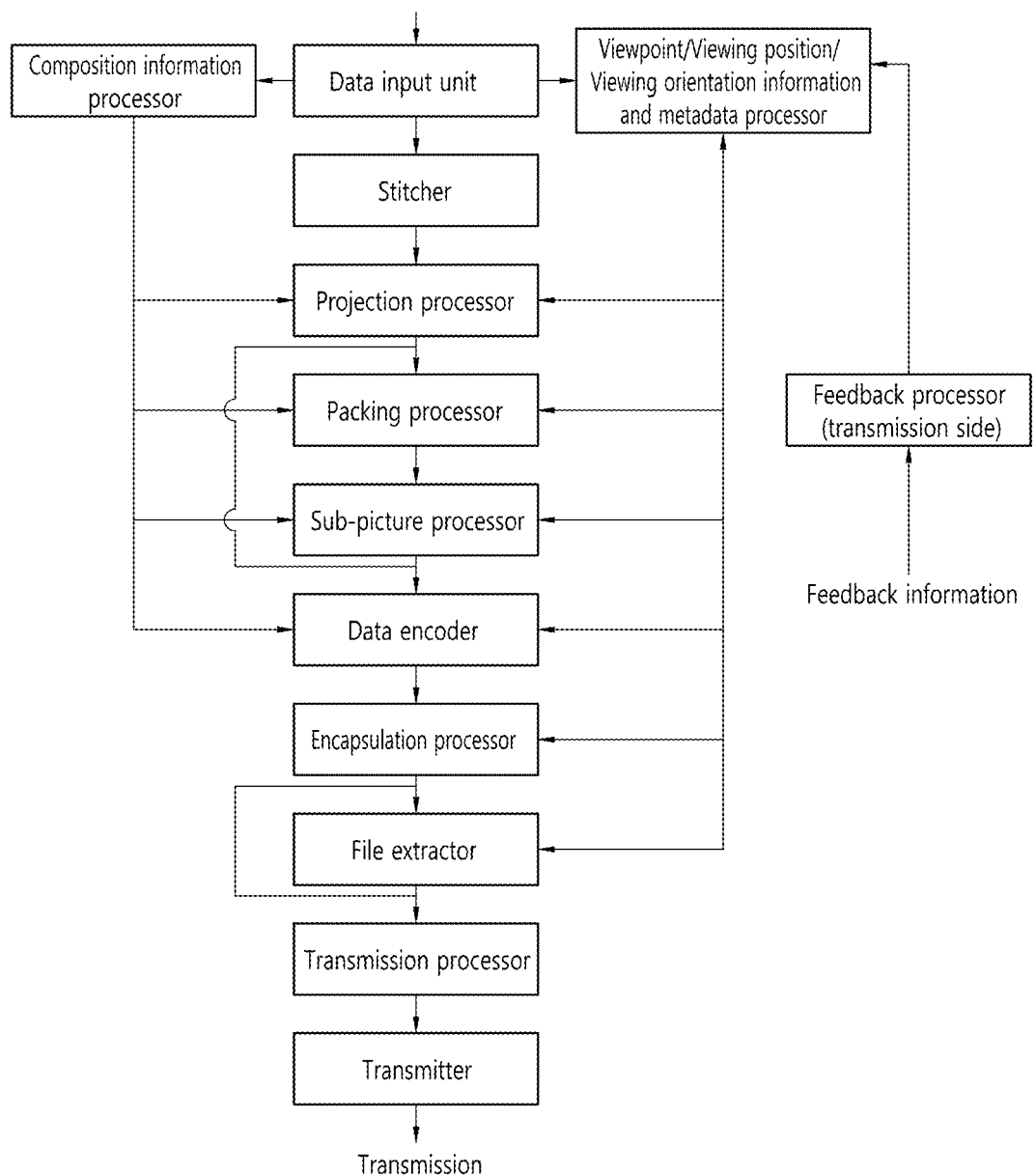
FIG. 16 is a diagram schematically showing an example of configuration of a 3DoF+ transmission point.

FIG. 16 is a diagram schematically showing an example of configuration of a 3DoF+ transmission point.

Referring to FIG. 16, if input data is an image output from a camera, a transmission point (a 360 video transmission apparatus) may perform a stitching process for each viewpoint/viewing position/component to reconfigure a sphere image. When a sphere image for each viewpoint/viewing position/component is configured, the image may be projected into a 2D image for coding. According to an application, a packing process may be performed to pack multiple images into an integrated image or an image may be partitioned into sub-pictures of detailed regions. As described above, region-wise packing may be an optional process and thus may not be performed, and, in this case, a packing processor may be omitted. If the input data is image/voice/text additional information, a method for adding the information to a central image to be displayed may be informed, and additional data may be transmitted together. An encoding process of generating a compressed image and added data into a bit stream, and an encapsulation process of transforming the bit stream into a file format for transmission or storage may be performed. In this case, depending on a demand from an application or system, a process of extracting a file necessary for a receiver may be performed. The generated bit stream may be transformed into a transmission format by a transmission processor and then transmitted. In this case, a transmission-side feedback processor may process viewpoint/viewing position/viewing orientation information and necessary metadata based on information received from the reception point so that the transmitter can process the information and the metadata.

Figure 17:
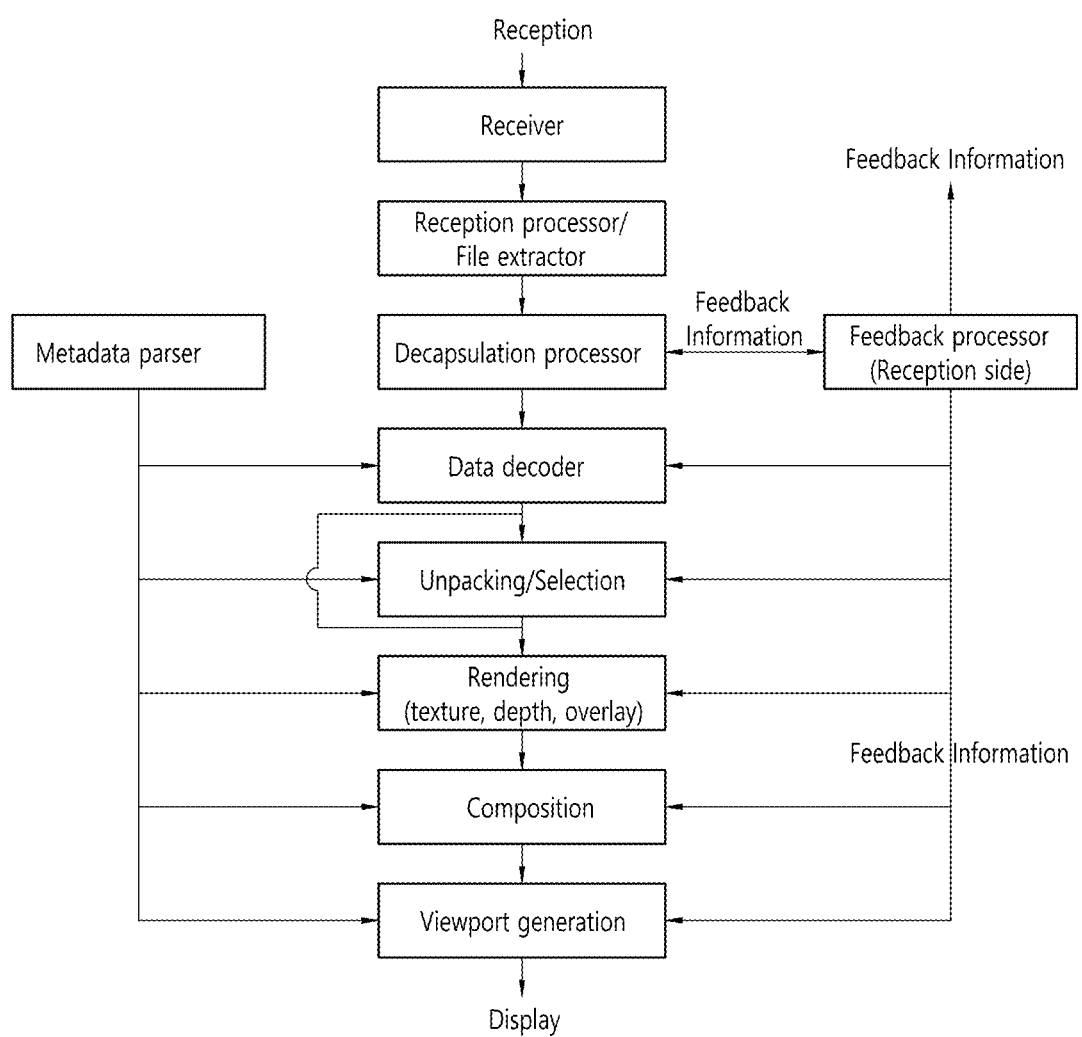
FIG. 17 is a diagram schematically showing an example of configuration of a 3DoF+ reception point.

FIG. 17 is a diagram schematically showing an example of configuration of a 3DoF+ receiver.

Referring to FIG. 17, a reception point (a 360 video reception apparatus) may receive a bit stream transmitted from a transmission point, and extract a necessary file from the bit stream. It is possible to select an image stream in a generated file format using viewpoint/viewing position/viewing orientation information and video metadata delivered from a feedback processor, and to reconfigure the selected bit stream into image information using a decoder. Packed images may be unpacked based on packing information transmitted through metadata. If the packing process is omitted in the transmission point, unpacking in the reception point may be omitted as well. In addition, as necessary, it is possible to perform a process of selecting an image suitable for a viewpoint/viewing position/viewing orientation delivered from the feedback processor and a necessary component. It is possible to perform a rendering process of reconfiguring an image into a format suitable to reproduce texture, depth, overlay information of the image. Before generating a final image, a composition process may be performed to integrate information of different layers, and an image suitable for a display viewport may be generated and reproduced.

FIGS. 8A to 18C are diagrams showing an example of a plurality of viewpoints in 360 content.

According to an embodiment of the present invention, a user may perform viewpoint switching based on a plurality of viewpoints under 3DoF, 3DoF+, or 6DoF environments, thereby enabled to experience 360 video from diverse perspectives. In this case, a viewpoint on which viewpoint switching is allowed to be performed may be referred to as a hotspot. Because the hot spot indicates a viewpoint on which viewpoint switching is allowed to be performed among viewpoints, the hotspot may be construed as a subordinate concept of a viewpoint. In some cases, however, the hotspot may be construed as a concept identical/similar to a viewpoint. Therefore, any "viewpoint" disclosed throughout the present specification may be replaced by a hotspot, and any "hotspot" disclosed throughout the present specification may be replaced by a view point. In addition, hotspot-related information such as "hotspot metadata" may be also replaced by "viewpoint metadata".

In one embodiment, hotspots may be used in omnidirectional video, enabling a user to search for 360 environment at a plurality of view points. In one example, circular diagrams shown in FIGS. 18A to 18C may indicate hotspots. The circular diagrams in FIG. 18A may indicate locations of hotspots in a 360 video scene, and, if the user approaches a specific hot spot using a mouse pointer, a keyboard, or his/her body such as a finger, the circular diagram indicative of the hotspot may increase in size, as shown in FIG. 18B. If a user selects a specific hotspot by clicking, tapping, or inputting the same, viewpoint switching indicating that a view point is switched to a clicked hotspot may be performed, as shown in FIG. 18C.

Figure 18A:
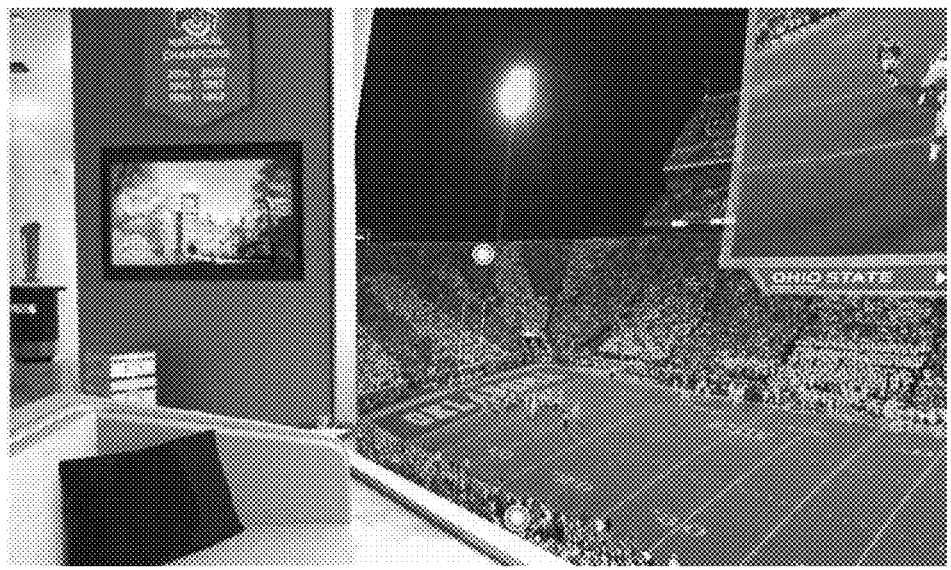
FIGS. 18A to 18C are diagrams showing an example for describing multiple-viewpoints included in 360-degree content.
Figure 18B:
Figure 18C:

As shown in FIGS. 18A to 18C, in order to perform viewpoint switching based on a hotspot, at least one of the following may be required: information on spherical coordinates of a hotspot center at which the hotspot is displayed; information on a duration for which the hotspot is displayed; information on content identifier to be reproduced or displayed when the hotspot is selected; information on a transition effect of when a viewpoint is switched to a new viewpoint to which a hotspot is applied; information on grouping of video tracks capable of being switched in a 360 scene through hotspot; information on a main (or default) video to be reproduced or played based on a contiguous viewpoint hotspot when a scene starts; and information on coordinates of the center of a hotspot based on a non-contiguous viewpoint hotspot.

In one embodiment, timed hotspot metadata may indicate hotspot information that enables a user to enjoy omnidirectional video based on a plurality of viewpoints. The timed hotspot metadata may include at least one of the following: information on spherical coordinates of the center of hotspots; information on identifier of a video track to be reproduced when a hotspot is selected; and information on a transition effect of when a viewpoint is switched to a new viewpoint after the hotspot is selected. Meanwhile, it is easily understood by a person skilled in the art that the timed hotspot metadata may be called timed viewpoint metadata, timed metadata, viewpoint information, metadata, etc.

A 360-degree video transmission apparatus according to an embodiment of the present invention may generate metadata for 360-degree video data. More specifically, a metadata processor of the 360-degree video transmission apparatus may generate metadata for 360-degree video data.

In one embodiment, the metadata may include information on viewpoint group ID, and multiple-viewpoints related to the 360-degree video data may be categorized into at least one viewpoint group based on the viewpoint group ID.

In one example, a process of categorizing the multiple-viewpoints related to the 360-degree video data into at least one viewpoint group may be based on hotspot video track grouping. TrackGroupTypeBox of which track_group_type is "hots" may indicate that the corresponding track is contained in tracks capable of being switched in a 360 scene through hotspots. Tracks to be mapped to this grouping (that is, visual tracks having the same track_group_id in TrackGroupTypeBox of which track_group_type is "hots") may belong to the same 360 environment/scene and may be used for reproduction (play) of when viewpoint switching to different viewpoints through hotspots is performed. Information according to this example may be signaled, as shown in the following Table 1.

TABLE 1 aligned(8) class HotSpotVideoGroupBox extends
TrackGroupTypeBox('hots') {
    unsigned int(8) hot_spot_type;
    string hot_spot_description;
}

In Table 1, hot_spot_type may indicate types of hotspots in a 360 environment/scene. The types of hotspots may include, for example, contiguous and non-contiguous. Detailed description about continuous and non-continuous will be provided with reference to FIGS. 19A and 19B. hot_spot_description may indicate a null-terminated Universal coded character set+Transformation Format-8 bit (UTF-8) string that provides textual description of the hotspots. The hot_spot_description may include a null-string.

In another example, the metadata in Table 1 may be specified as in the following Table 2.

TABLE 2 aligned(8) class HotSpotVideoGroupBox extends
TrackGroupTypeBox('hots') {
    unsigned int(4) hot_spot_type:
    unsigned int(3) hs_center_coord_type:
    unsigned int(1) main_flag:
    string hot_spot_description;
    if (hs_center_coord_type == 0) {
        signed int(32) center_x;
        signed int(32) center_y;
        signed int(32) center_z;
    } else if (hs_center_coord_type == 1) {
        signed int(32) center_azimuth;
        signed int(32) center_elevation;
        signed int(32) center_tilt
        signed int(32) radius;
    }
    if (main_flag == 1 (or 0)) {
        unsigned int(32) main_track_id;
    }
}

In Table 2, hs_center_coord_type may indicate a coordinate type of the center coordinate system of a hot spot group. For example, hs_center_coord_type may indicate whether the type of the center coordinate system of the hot spot group is presented based on x, y, z axes or based on a spherical coordinate system.

center_x, center_y and center_z may indicate locations of the center of a hot spot video on X-axis, Y-axis, and Z-axis. For example, center_x, center_y and center_z may indicate locations of the respective centers of continuous-viewpoint hot spots or continuous-viewpoint hot spot videos.

center_azimuth, center_elevation and center_radius may indicate spherical coordinate system information on the center of hot spot video. For example, center_azimuth, center_elevation and center_radius may indicate spherical coordinate system information of the center of a main video for contiguous-viewpoint hot spots or spherical coordinate system information of the centers of continuous-viewpoint hot spot videos.

In one example, center_azimuth may indicate information on azimuth of origin of the center coordinate system in reference to a global coordinate system, and center_radius may indicate elevation of origin of the center coordinate system in reference to the global coordinate system.

The term "center coordinate system" used throughout the present specification may indicate a coordinate system at the center of a view point. The center coordinate system may imply identical/similar meanings of a common reference coordinate system, a reference coordinate system, and the like.

center_tilt may indicate information on a rotation angle of a coordinate system of the center of a hot spot group. The center_tilt may include information on a rotation angle by which a coordinate system of the center of a hot spot group is rotated relative to a global coordinate system when the origin of the coordinate system of the center of the hot spot group is matched with the origin of the global coordinate system.

The main flag may indicate whether a corresponding hot spot is a main media (i.e., whether video, audio, or the like is included) to be reproduced or played upon start of a scene including a hot spot video group starts or upon return from a selected hot spot. When a value of main_flag is 0, it may indicate that a corresponding video is not a main video or audio. In one example, main_flag may correspond to an initial viewpoint flag that indicates whether a corresponding viewpoint included in a viewpoint group is an initial viewpoint.

main_track_ID may indicate ID information on a media track of when a scene including hot spots starts or a media track which is returned from a hot spot.

In one embodiment, metadata for 360 video data may include information on a selectable viewpoint group indicating viewpoints for which viewpoint selection is needed. For example, in TrackHeaderBox and TrackSelectionBox, attribute_list with alternate_group of which a value is not 0 but 'hots' may indicate that a corresponding track is included in a track group including a hot spot video related to other viewpoints.

In another example, metadata may include information on a switchable viewpoint group indicating viewpoints for which viewpoint switching is allowed. For example, switch_group in TrackSelectionBox has a value other than 0, it may indicate that a corresponding track belongs to a switch group that can be switched during reproduction.

In one embodiment, ID may be an integer that provides reference from a corresponding track to a different track. 'hots', which is an example of reference_type, may indicate that a corresponding track includes a hot spot video relating to a reference video track.

In another embodiment, the metadata shown in Table 1 may be specified as in the following Table 3.

TABLE 3

```
aligned(8) class HotSpotSample( ) {
    unsigned int(8)  num_hot_spots;
    for (i = 0; i < num_hot_spots: i++) {
        bit(6) reserved = 0;
        unsigned    int(1)     main_flag[i];
        unsigned    int(1)     transition_effect_flag[i];
        signed      int(32)    hot_spot_azimuth[i];
        signed      int(32)    hot_spot_elevation[i];
        unsigned    int(32)    hot_spot_tract_ID[i];
        if(main_flag [i] == 0) {
            unsigned int(32) main_track_ID[i];
        }
        if (transition_effect_flag) {
            unsigned int(8) transition_effect_type[i];
        }
    }
}
```

In Table 3, num_hot_spots indicates the number of hotspots provided through a hotspot sample format, and transition_effect_flag may indicate whether a specific transition effect is applied when a viewpoint is switched to a new viewpoint after a hotspot is selected. When transition_effect_flag has a value of 0, it indicates that a viewpoint is directly switched to a specific hotspot without a transition effect. hot_spot_azimuth and hot_spot_elevation may indicate an azimuth angle and an elevation angle of a center point of a hotspot in reference to global coordinate axes.

transition_effect_type may indicate transition effects of when a viewpoint is switched to a new viewpoint after a hotspot is selected. For example, transition effects as shown in the following Table 4 may be provided.

TABLE 4

| Value | Description |
| --- | --- |
| 0 | Zoom-in effect to the hot spot point and go to the point |
| 1 | Walk though effect to the hot spot point |
| 2-255 | Reserved for future extension |

In the example shown in Table 4, when transition_effect_type has a value of 0, it may indicate a zoom-in effect which is a transition effect of zooming in to a specific viewpoint, and, when transition_effect_type has a value of 1, it may indicate a walking-through effect which is a transition effect of walking toward a specific viewpoint.

Meanwhile, Table 1 is merely an example showing that multiple viewpoints related to 360 video data are included in a specific group of which track_group_type is 'hots'. An example in which the multiple viewpoints related to the 260-degree video data are categorized into at least one viewpoint group may be shown as in the following Table 5.

TABLE 5

```
aligned(8) class ViewpointGroupStruct( ) {
    unsigned int(8) vwpt_group_id;
    string vwpt_group_description;
}
```

In Table 5, vwpt_group_id may indicate ID information of a viewpoint group. All viewpoints in a viewpoint group may share a common reference coordinate system. vwpt_group_description may indicate a null-terminated UTF=8 string that describes a viewpoint group.

In one embodiment, TrackGroupTypeBox of which track_group_type is 'hots' in Table 1 may correspond to vwpt_group_id in Table 5.

Meanwhile, in another embodiment, metadata related to the above Table 2 or Table 3 may be signaled based on the metadata shown in the following Table 6.

TABLE 6

```
aligned(8) ViewpointPosStruct( ) {
    signed int(32) viewpoint_pos_x;
    signed int(32) viewpoint_pos_y;
    signed int(32) viewpoint_pos_z;
    unsigned int(1) viewpoint_gpspos_present_flag;
    bit(31) reserved = 0;
    if(viewpoint_gpspos_present_flag) {
        signed int(32) viewpoint_gpspos_longitude;
        signed int(32) viewpoint_gpspos_latitude;
        signed int(32) viewpoint_gpspos_altitude;
    }
}
aligned(8) class ViewpointGlobalCoordinateSysRotationStruct( ) {
    signed int(32) viewpoint_gcs_yaw;
    signed int(32) viewpoint_gcs_pitch;
    signed int(32) viewpoint_gcs_roll;
}
```

In Table 6, viewpoint_pos_x, viewpoint_pos_y, and viewpoint_pos_z may indicate information on X-axis, Y-axis, and Z-axis of the specific viewpoint. When the viewpoint has a static position, viewpoint_pos_x, viewpoint_pos_y, and viewpoint_pos_z may represent X-axis, Y-axis, and Z-axis of the specific viewpoint, and, when the viewpoint has a dynamic position, X-axis, Y-axis, and Z-axis of the specific viewpoint may represent initial locations of the center point of the specific viewpoint.

In one embodiment, since hot_spot_azimuth and hot_spot_elevation in Table 3 indicates information on a location of a center point of a specific view point, hot_spot_azimuth and hot_spot_elevation in Table 3 may correspond to viewpoint_pos_x, viewpoint_pos_y, and viewpoint_pos__z in Table 6.

viewpoint_gcs_yaw, viewpoint_gcs_pitch, and viewpoint_gcs_roll in Table 6 may indicate information on a rotation angle of a center coordinate system (or a common reference coordinate system) of a specific viewpoint group. Specifically, the viewpoint_gcs_yaw, viewpoint_gcs_pitch, and viewpoint_gcs_roll may indicate information on a rotation angle by which the center coordinate system is rotated relative to a global coordinate system when the origin of the center coordinate system is matched with the origin of the global coordinate system. Considering that the viewpoint_gcs_yaw, viewpoint_gcs_pitch, and viewpoint_gcs_roll in Table 6 indicate information on a rotation angle of a center coordinate system (or a common reference coordinate system) of a specific viewpoint group), it is apparent to those skilled in the art that viewpoint_gcs_yaw, viewpoint_gcs_pitch, and viewpoint_gcs_roll correspond to center_tilt in Table 2.

Meanwhile, in another example, information corresponding to main_track_ID may be signaled through id_of_initial_viewpoint in the following Table 7.

TABLE 7

```
aligned(8) InitialViewpointSample( ) {
    unsigned int(32) id_of_initial_viewpoint;
}
``` id_of_initial_viewpoint in Table 7 may indicate initial viewpoint ID information of a viewpoint group related to 360-degree video data. An initial viewpoint of the viewpoint group may be indicated based on the initial viewpoint ID information.

Figure 19A:
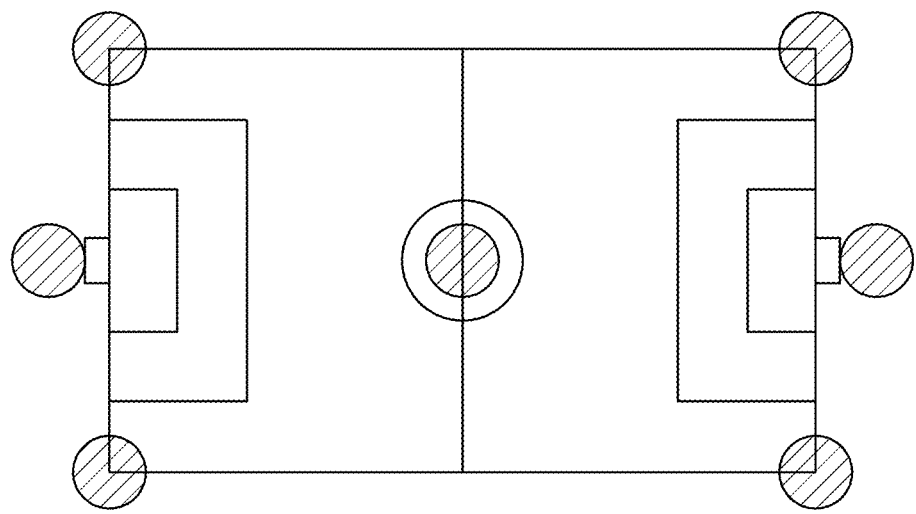
FIGS. 19A and 19B are diagram exemplarily showing distribution of multiple viewpoints.
Figure 19B:
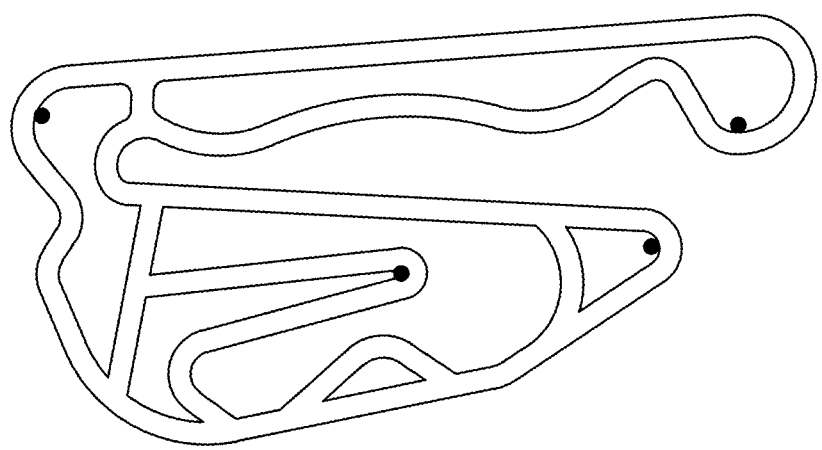

FIGS. 19A and 19B are diagram exemplarily showing distribution of multiple viewpoints.

Viewpoints (hatched circular shapes) included in FIG. 19A may show example of contiguous viewpoints, and viewpoints (shaded circular shapes) included in FIG. 19B may show examples of non-contiguous viewpoints.

In a 360-degree video including multiple viewpoints, when a specific viewpoint (i.e., a first viewpoint) is suddenly switched to another viewpoint (i.e., a second viewpoint), a user may feel nausea. Whether the first viewpoint and the second viewpoint contains overlapping contents may be decided depending on whether the first viewpoint and the second viewpoint are included in the same/similar scene.

The example of FIG. 19A is about contiguous viewpoints, and the viewpoints shown in FIG. 19A commonly contain overlapping contents. Whether a before-switching viewpoint and an after-switching viewpoint contain overlapping contents may apply correlation to a user's viewports before switching and after switching.

The example of FIG. 19B is about non-contiguous viewpoints, and the viewpoints shown in FIG. 19B do not contain overlapping contents. When non-contiguous viewpoints are switched, a user may feel nausea less compared to when contiguous viewpoints are switched. It is because there is no direct correlation between a before-switching viewport and an after-switching viewport.

Meanwhile, although FIGS. 19A and 19B differentiate contiguous and non-contiguous by physical locations, embodiments of the present invention are not limited thereto. For example, even when there is correlation of meaning between viewpoints subject to switching, viewpoints in correlation of meaning may be categorized as contiguous viewpoints.

Figure 20:
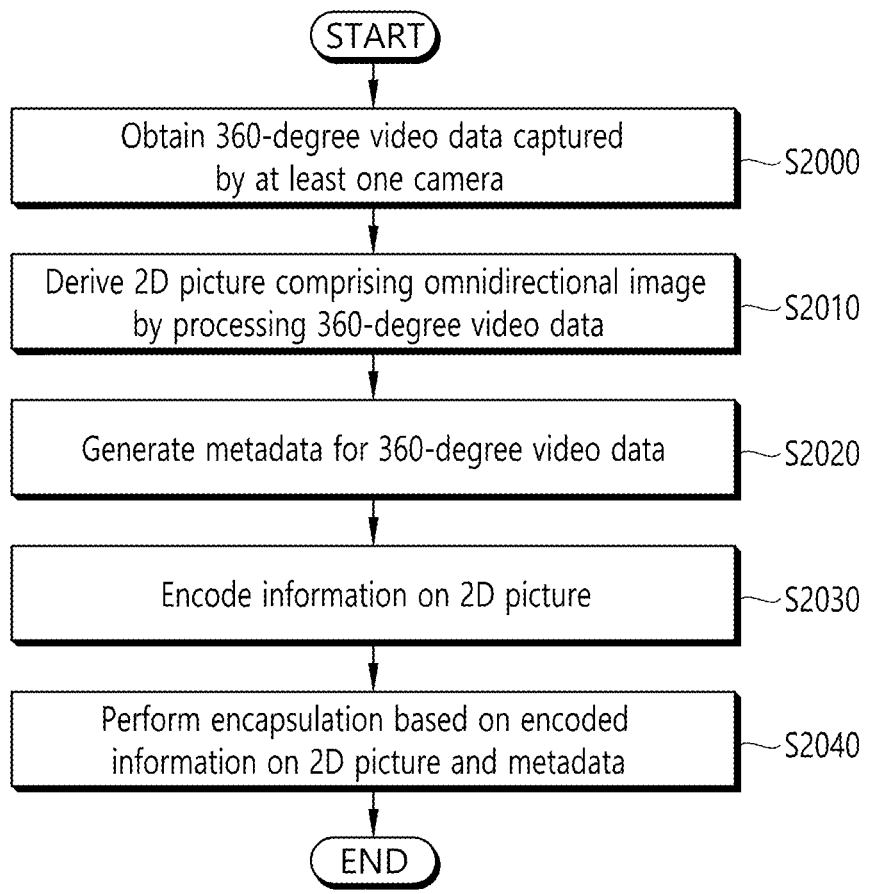
FIG. 20 is a flowchart showing an operation method of a 360-degree video transmission apparatus according to an embodiment of the present invention.
Figure 21:
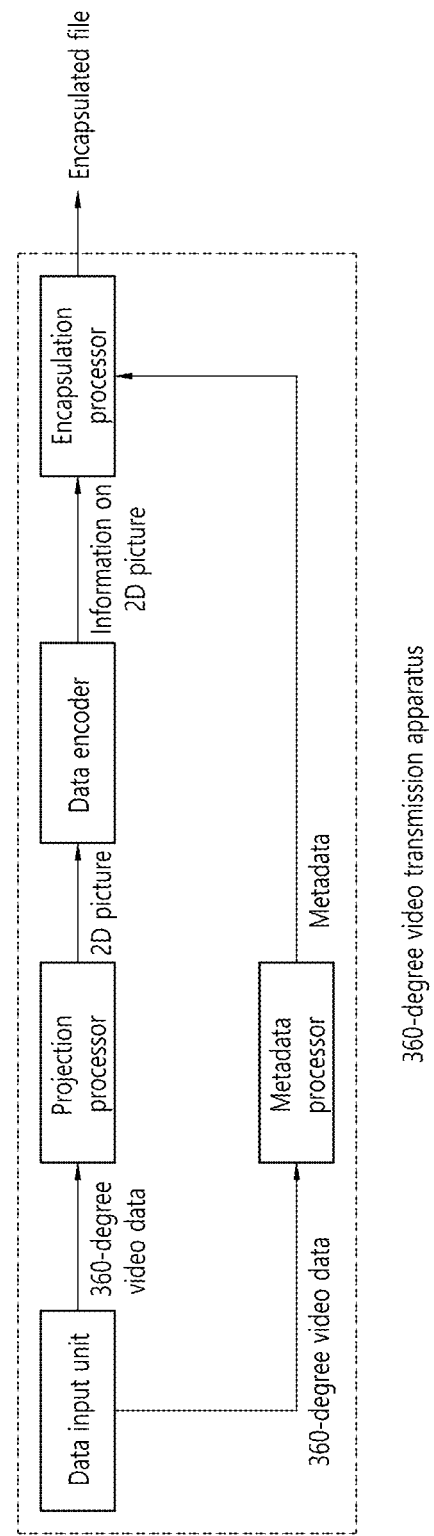
FIG. 21 is a block diagram showing configuration of a 360-degree video transmission apparatus according to an embodiment of the present invention.

FIG. 20 is a flowchart showing an operation method of a 360-degree video transmission apparatus according to an embodiment of the present invention, and FIG. 21 is a block diagram showing configuration of a 360-degree video transmission apparatus according to an embodiment of the present invention.

Each step shown in FIG. 20 may be performed by the 360 video transmission apparatus shown in FIG. 5, the 360 video transmission apparatus shown in FIG. 14A, the FLUS source shown in FIG. 15, or the 360 video transmission apparatus shown in FIG. 21. In one example, S2000 in FIG. 20 may be performed by the data input unit of the 360 video transmission apparatus shown in FIG. 5; S2010 in FIG. 20 may be performed by the projection processor of the 360 video transmission data shown in FIG. 5; S2020 in FIG. 20 may be performed by the metadata processor shown in FIG. 5; S2030 in FIG. 20 may be performed by the data encoder of the 360 video transmission apparatus shown in FIG. 5; S2040 in FIG. 20 may be performed by the encapsulation processor of the 360 video transmission apparatus shown in FIG. 5. Accordingly, as for description of each step in FIG. 20, detailed description redundant with the description above provided with reference to FIGS. 5, 14A, and 15 may be omitted or may be provided briefly.

As shown in FIG. 21, a 360-degree video transmission apparatus according to an embodiment of the present invention may include a data input unit, a projection processor, a metadata processor, a data encoder, and an encapsulation processor. In some cases, however, not all the element shown in FIG. 21 are necessarily essential for the 360-degree video transmission apparatus, and a 360-degree video transmission apparatus may be implemented by components in a number more or less than elements shown in FIG. 21.

In the 360-degree video transmission apparatus according to an embodiment of the present invention, the data input unit, the projection processor, the metadata processor, the data encoder, and the encapsulation processor may be realized as separate chips or at least two of them may be realized as one chip.

In the present specification, "360 video" and "360-degree video" may imply the same subject despite slight difference in expression. Accordingly, the "360 video transmission apparatus" shown in FIG. 5 and the "360-degree video transmission apparatus" shown in FIG. 21 may perform the same/similar operations despite slight difference in expression, and the "360 video reception apparatus" shown in FIG. 6 and the 360-degree video reception apparatus" shown in FIG. 23 may perform the same/similar operations despite slight difference in expression A 360-degree video transmission apparatus according to an embodiment of the present invention may acquire 360-video data captured by at least one camera (S2000). More specifically, a data input unit of the 360-degree video transmission apparatus may acquire 360-video data captured by at least one camera.

The 360-degree video transmission apparatus according to an embodiment of the present invention may derive a 2D picture including an omnidirectional image by processing the 360-degree video data (S2010). More specifically, a projection processor of the 360-degree video transmission apparatus may derive a 2D picture including an omnidirectional image by processing 360-degree video data.

The 360-degree video transmission apparatus according to an embodiment of the present invention may generate metadata for the 360-degree video data (S2020). More specifically, a metadata processor of the 360-degree video transmission apparatus may generate metadata for 360-degree video data.

Throughout the present specification, a "first viewpoint", a "second viewpoint", a "third viewpoint", and a "fourth viewpoint" are arbitrarily distinguished viewpoints included in 360-degree video data, and accordingly, it will be apparent to those skilled in the art that the aforementioned viewpoints indicate pre-defined viewpoints and that the ordinal numbers of the aforementioned viewpoints are not intended to be limiting the present invention.

In one embodiment, the metadata may include information on viewpoint group ID, and multiple-viewpoints related to the 360-degree video data may be categorized into at least one viewpoint group based on the viewpoint group ID.

In one example, the multiple-viewpoints may include a first viewpoint and a second viewpoint, and, when viewpoint group ID of the first viewpoint and viewpoint group ID of the second viewpoint are identical, the first viewpoint and the second viewpoint may be included in a first viewpoint group. More specifically, viewpoints having the same viewpoint group ID among the multiple-viewpoints may be included in the same group.

In one example, the first viewpoint and the second viewpoint in the first viewpoint group may share a common reference coordinate system. In addition, the multiple-viewpoints may further include a third viewpoint included in a second viewpoint group different from the first viewpoint group, and a common reference coordinate system for third viewpoint may be different from the common reference coordinate system for the first viewpoint. More specifically, viewpoints included in the same group among the multiple-viewpoints may share a common reference coordinate system.

In one embodiment, the metadata may include description information for one of the at least one viewpoint group. In one example, the description information may be based on a null-terminated UTF-8 string. The description information may include a null string.

In one embodiment, the metadata may include information on a location of a center point of a fourth viewpoint included in the multiple-viewpoints. In this case, the information on the location of the center point of the fourth viewpoint may be present based on a common reference coordinate system.

In one embodiment, viewpoint switching between the first viewpoint and the second viewpoint included in the first viewpoint group may be performed. At this point, the metadata may include a transition effect flag indicating whether to apply a transition effect when the first viewpoint is switched to the second viewpoint as a result of the viewpoint switching.

In one example, when the transition effect flag indicates 1, the metadata may include transition effect type information indicating a type of the transition effect. In a more detailed example, the transition effect type information may include at least one of the following: information on a zoom-in effect indicating a transition effect of zooming in to the second viewpoint and information on a walking-through effect indicating a transition effect of walking toward the second viewpoint.

In one embodiment, the metadata may include initial viewpoint ID information of a viewpoint group related to the 360-degree video data. An initial viewpoint of the view point group may be indicated based on the initial viewpoint ID information.

In one example, the initial viewpoint may indicate a viewpoint of when a 360-degree video scene including the viewpoint group is first reproduced. In another example, the initial viewpoint may indicate a viewpoint returned from another viewpoint included in the viewpoint group.

In one embodiment, the metadata may include information on a center coordinate system of the viewpoint group.

In one example, the information on the center coordinate system may include information on a rotation angle of the center coordinate system. The information on the rotation angle of the center coordinate information may include information on a rotation angle by which the center coordinate system is rotated relative to a global coordinate system when the origin of the center coordinate system is matched with the origin of the global coordinate system.

In another example, the information on the center coordinate system may further include information on azimuth of the origin of center coordinate system in reference to a global coordinate system, and information on elevation of the origin of the center coordinate system in reference to the global coordinate system.

In one embodiment, the metadata may include initial viewpoint flag information indicating whether a first viewpoint included in the viewpoint group is the initial viewpoint. In one example, when the initial viewpoint flag information indicates 0, a second viewpoint indicated based on the initial viewpoint ID information may be determined as the initial viewpoint. The second viewpoint included in the viewpoint group may be different from the first viewpoint. In another example, when the initial viewpoint flag information indicates 1, the first viewpoint may be indicated as the initial viewpoint.

In one embodiment, the metadata may include information on a switchable viewing point group indicating viewpoints for which viewpoint switching is allowed.

In another embodiment, the metadata may include information on a selectable viewpoint group indicating viewpoints for which viewpoint selection is needed.

In yet another embodiment, the metadata may include information on a first track, and the information on the first track may include track ID information necessary to refer to a second track different from the first track.

The 360-degree video transmission apparatus according to one embodiment of the present invention may encode information on the 2D picture (S2030). More specifically, the data encoder of the 360-degree video transmission apparatus may encode the information on the 2D picture.

The 360-degree video transmission apparatus according to one embodiment of the present invention may perform encapsulation based on the information on the 2D picture and metadata (S2040). The encapsulation processor of the 360-degree video transmission apparatus may perform encapsulation based on the information on the 2D picture and the metadata.

According to the 360-degree video transmission apparatus and the operation method thereof in FIGS. 19 and 20, the 360-degree video transmission apparatus according to an embodiment of the present invention may acquire 360-degree video data captured by at least one camera (S2000), derive a 2D picture including an omnidirectional image by processing the 360-degree video data (S2010), generate metadata for the 360-degree video data (S2200), encode information on the 2D picture (S2030), and perform encapsulation based on the information on the 2D picture and the metadata (S2040), wherein the metadata includes initial viewpoint ID information of a viewpoint group related to the 360-degree video data. Accordingly, it is possible to effectively signal information on an initial viewpoint of a viewpoint group including multiple viewpoints in a 360-degree video.

Figure 22:
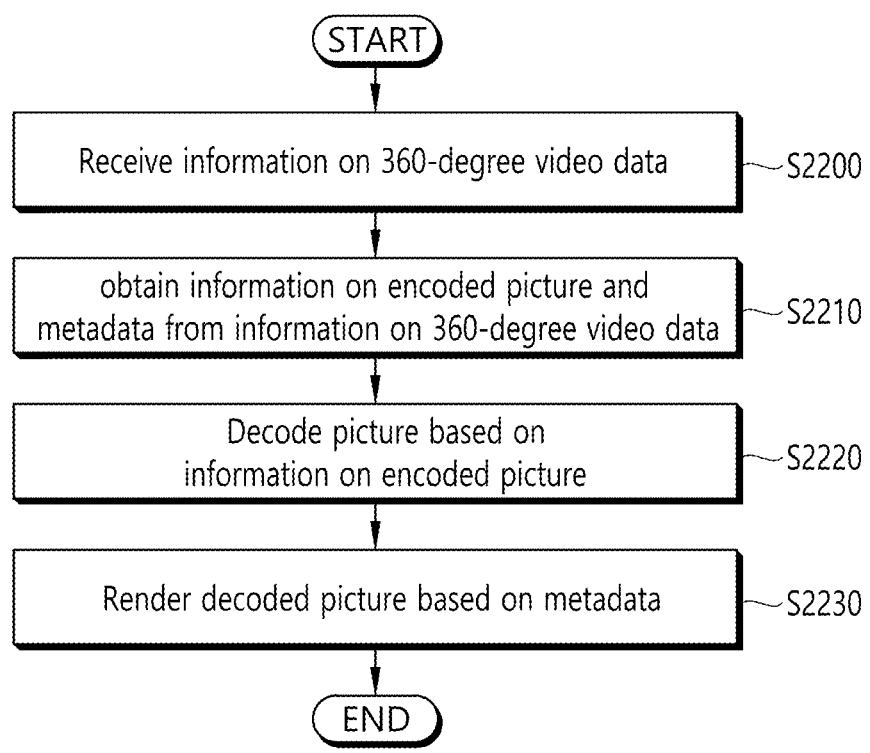
FIG. 22 is a flowchart showing an operation method of a 360-degree video reception apparatus according to an embodiment of the present invention.
Figure 23:
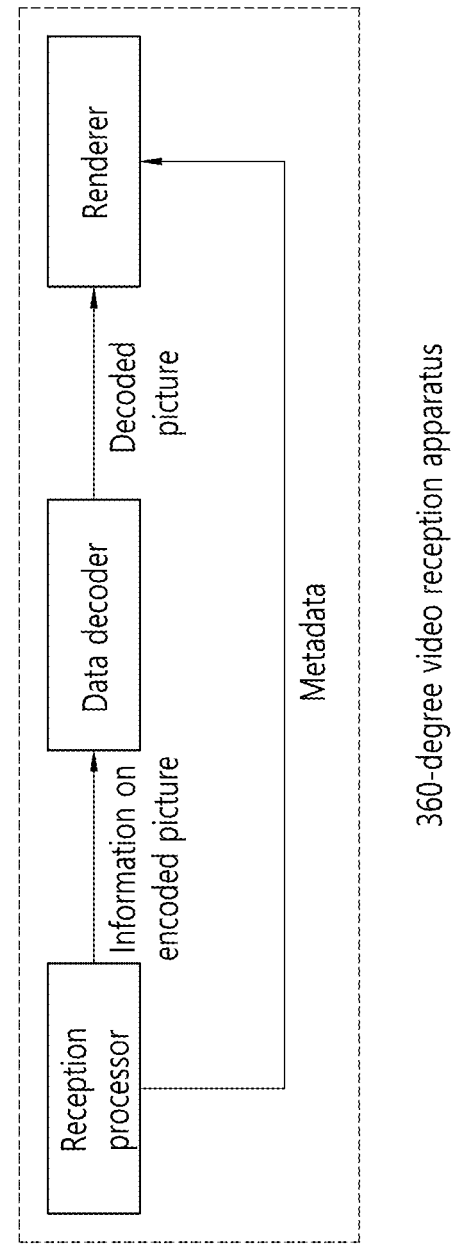
FIG. 23 is a block diagram showing configuration of a 360-degree video reception apparatus according to an embodiment of the present invention.

FIG. 22 is a flowchart showing an operation method of a 360-degree video reception apparatus according to an embodiment of the present invention, and FIG. 23 is a block diagram showing configuration of a 360-degree video reception apparatus according to an embodiment of the present invention.

The 360-degree video reception apparatus and the operation method thereof in FIGS. 22 and 23 may partially correspond to the 360-degree video reception apparatus and the operation method thereof in FIGS. 20 and 21. Therefore, some redundant operations therebetween may be herein described briefly or omitted.

Each step shown in FIG. 22 may be performed by the 360-degree video reception apparatus shown in FIG. 6, the 360-degree video reception apparatus shown in FIG. 14B, the FLUS sink shown in FIG. 15, or the 360-degree video reception apparatus shown in FIG. 23. In one example, S2200 and S2210 in FIG. 22 may be performed by the reception processor of the 360-degree video reception apparatus shown in FIG. 6; S2220 in FIG. 22 may be performed by the data decoder of the 360-degree video reception data shown in FIG. 6; and S2230 in FIG. 22 may be performed by the renderer shown in FIG. 6. Accordingly, as for description of each step in FIG. 22, detailed description redundant with the description above provided with reference to FIGS. 6, 14B, and 15 may be omitted or may be provided briefly.

As shown in FIG. 23, the 360-degree video reception apparatus according to an embodiment may include a reception processor, a data decoder, and a renderer. In some cases, however, not all the elements shown in FIG. 23 are essential elements of the 360-degree video reception apparatus, and the 360-degree video reception apparatus may be implemented by elements in a number more or less than the number of elements shown in FIG. 23.

In the 360-degree video reception apparatus according to an embodiment of the present invention, the reception processor, the data decoder, and the renderer may be realized as separate chips or at least two of the elements may be realized as one chip.

The 360-degree video reception apparatus according to an embodiment of the present invention may receive information on 360-degree video data (S2200). More specifically, the reception processor of the 360-degree video reception apparatus may receive information on the 360-degree video data.

In one embodiment, the 360-degree video reception apparatus may receive information on 360-degree video data from a 360-degree video transmission apparatus, and the information on the 360-degree video data may, for example, include a file derived by perform encapsulation by the 360-degree transmission apparatus based on information on an encoded picture and metadata for the 360-degree video data. However, examples of the 360-degree video data are not limited thereto.

The 360-degree video reception apparatus according to an embodiment of the present invention may acquire the information on the encoded picture and the metadata for the 360-degree video data from the information on the 360-degree video data (S2210). More specifically, the reception processor, the metadata parser, or the decapsulation processor of the 360-degree video reception apparatus may acquire information on an encoded picture and metadata from the 360-degree video data.

In one embodiment, the metadata may include information on viewpoint group ID, and multiple-viewpoints related to the 360-degree video data may be categorized into at least one viewpoint group based on the viewpoint group ID.

In one example, the multiple viewpoints may include a first viewpoint and a second viewpoint, and, when viewpoint group ID of the first viewpoint and viewpoint group ID of the second viewpoint are identical, the first viewpoint and the second viewpoint may be included in a first viewpoint group. More specifically, viewpoints having the same viewpoint group ID among the multiple viewpoints may be included in the same group.

In one example, the first viewpoint and the second viewpoint in the first viewpoint group may share a common reference coordinate system. In addition, the multiple-viewpoints may further include a third viewpoint included in a second viewpoint group different from the first viewpoint group, and a common reference coordinate system for third viewpoint may be different from the common reference coordinate system for the first viewpoint. More specifically, viewpoints included in the same group among the multiple-viewpoints may share a common reference coordinate system.

In one embodiment, the metadata may include description information for one of the at least one viewpoint group. In one example, the description information may be based on a null-terminated UTF-8 string. The description information may include a null string.

In one embodiment, the metadata may include information on a location of a center point of a fourth viewpoint included in the multiple-viewpoints. In this case, the information on the location of the center point of the fourth viewpoint may be present based on a common reference coordinate system.

In one embodiment, viewpoint switching between the first viewpoint and the second viewpoint included in the first viewpoint group may be performed. At this point, the metadata may include a transition effect flag indicating whether to apply a transition effect when the first viewpoint is switched to the second viewpoint as a result of the viewpoint switching.

In one example, when the transition effect flag indicates 1, the metadata may include transition effect type information indicating a type of the transition effect. In a more detailed example, the transition effect type information may include at least one of the following: information on a zoom-in effect indicating a transition effect of zooming in to the second viewpoint and information on a walking-through effect indicating a transition effect of walking toward the second viewpoint.

In one embodiment, the metadata may include initial viewpoint ID information of a viewpoint group related to the 360-degree video data. An initial viewpoint of the view point group may be indicated based on the initial viewpoint ID information.

In one example, the initial viewpoint may indicate a viewpoint of when a 360-degree video scene including the viewpoint group is first reproduced. In another example, the initial viewpoint may indicate a viewpoint returned from another viewpoint included in the viewpoint group.

In one example, the initial viewpoint may indicate a viewpoint of when a 360-degree video scene including the viewpoint group is first reproduced. In another example, the initial viewpoint may indicate a viewpoint returned from another viewpoint included in the viewpoint group.

In one example, the information on the center coordinate system may include information on a rotation angle of the center coordinate system. The information on the rotation angle of the center coordinate information may include information on a rotation angle by which the center coordinate system is rotated relative to a global coordinate system when the origin of the center coordinate system is matched with the origin of the global coordinate system.

In another example, the information on the center coordinate system may further include information on azimuth of the origin of center coordinate system in reference to a global coordinate system, and information on elevation of the origin of the center coordinate system in reference to the global coordinate system.

In one embodiment, the metadata may include initial viewpoint flag information indicating whether a first viewpoint included in the viewpoint group is the initial viewpoint. In one example, when the initial viewpoint flag information indicates 0, a second viewpoint indicated based on the initial viewpoint ID information may be determined as the initial viewpoint. The second viewpoint included in the viewpoint group may be different from the first viewpoint. In another example, when the initial viewpoint flag information indicates 1, the first viewpoint may be indicated as the initial viewpoint.

In one embodiment, the metadata may include information on a switchable viewing point group indicating viewpoints for which viewpoint switching is allowed.

In another embodiment, the metadata may include information on a selectable viewpoint group indicating viewpoints for which viewpoint selection is needed.

In yet another embodiment, the metadata may include information on a first track, and the information on the first track may include track ID information necessary to refer to a second track different from the first track.

The 360-degree video reception apparatus according to an embodiment of the present invention may decode the encoded picture based on the information on the encoded picture (S2220). More specifically, the data decoder of the 360-degree video reception apparatus may decode the encoded picture based on the information on the encoded picture.

The 360-degree video reception apparatus according to an embodiment of the present invention may render the decoded picture based on the metadata (S2230). More specifically, the renderer of the 360-degree video reception apparatus may render the decoded picture based on the metadata.

According to the 360-degree video reception apparatus and the operation method thereof in FIGS. 22 and 23, the 360-degree video reception apparatus according to an embodiment of the present invention may receive information on 360-degree video data (S2200), acquire information on an encoded picture and metadata from the 360-degree video data (S2210), decode the picture based on the information on the encoded picture (S2220), and render the decoded picture based on the metadata (S2230), wherein the metadata includes initial viewpoint ID information of a viewpoint group related to the 360-degree video data. Accordingly, it is possible to effectively signal information on an initial viewpoint of a viewpoint group including multiple viewpoints in a 360-degree video.

The above-described parts, modules, or units may be processors or hardware parts that execute consecutive processes stored in a memory (or a storage unit). The steps described in the above-described embodiments can be performed by processors or hardware parts. The modules/blocks/units described in the above-described embodiments can operate as hardware/processors. In addition, the methods proposed by the present invention can be executed as code. Such code can be written on a processor-readable storage medium and thus can be read by a processor provided by an apparatus.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

The internal components of the above-described apparatuses may be processors which execute consecutive processes stored in a memory or hardware components. These components may be located inside/outside the apparatuses.

The above-described modules may be omitted or replaced by other modules which perform similar/identical operations according to embodiments.

The above-described parts, modules or units may be processors or hardware parts executing consecutive processes stored in a memory (or a storage unit). The steps described in the aforementioned embodiments can be performed by processors or hardware parts. Modules/blocks/units described in the above embodiments can operate as hardware/processors. The methods proposed by the present invention can be executed as code. Such code can be written on a processor-readable storage medium and thus can be read by a processor provided by an apparatus.

In the above exemplary systems, although the methods have been described based on the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

When the embodiments of the present invention are implemented in software, the above-described method may be implemented by modules (processes, functions, and so on) that perform the functions described above. Such modules may be stored in memory and executed by a processor. The memory may be internal or external to the processor, and the memory may be coupled to the processor using various well known means. The processor may comprise an application-specific integrated circuit (ASIC), other chipsets, a logic circuit and/or a data processing device. The memory may include a ROM (read-only memory), a RAM (random access memory), a flash memory, a memory card, a storage medium, and/or other storage device.

According to the present invention, it is possible to efficiently transmit VR content (360 content) in an environment that supports next-generation hybrid broadcast using a territorial broadcasting network and the Internet network.

According to the present invention, it is possible to provide interactive experience to a user who is enjoying 360 content.

According to the present invention, it is possible to efficiently deliver 360 content information necessary for a user, while increasing a transmission capacity.

According to the present invention, it is possible to efficiently store and transmit signaling information on 360-degree video data using an International Organization for Standardization (ISO)-based media file format such as an ISO base media file format (ISOBMFF).

According to the present invention, it is possible to transmit signaling information on 360-degree video data through HyperText Transfer Protocol (HTTP)-based adaptive streaming, such as Dynamic Adaptive Streaming over HTTP (DASH).

According to the present invention, it is possible to store and transmit signaling information on 360-degree video data through Supplemental Enhancement Information (SEI) message or Video Usability Information (VUI), thereby enhancing overall transmission efficiency.

According to the present invention, it is possible to effectively signal information on an initial viewpoint of a viewpoint group including multiple viewpoints in a 360-degree video.

What is claimed is:

1. A 360-degree video data processing method performed by a 360-degree video transmission apparatus, the method comprising:
    obtaining 360-degree video data;
    deriving pictures;
    generating metadata;
    encoding the pictures; and
    performing encapsulation based on the encoded pictures and the metadata,
    wherein:
    the metadata comprises initial viewpoint information representing that an initial viewpoint is present, and the initial viewpoint information includes initial viewpoint ID information that indicates the initial viewpoint for a sample to which the initial viewpoint ID information applies.

2. The method of claim 1, wherein an initial viewpoint of the viewpoint group is indicated based on the initial viewpoint ID information.

3. The method of claim 1, wherein the metadata comprises information on center coordinate system of the viewpoints.

4. The method of claim 3, wherein the information on the center coordinate system comprises information on rotation angle of the center coordinate system.

5. The method of claim 4, wherein the information on the rotation angle of the center coordinate system comprises information on angle of rotation of the center coordinate system from global coordinate system when an origin of the center coordinate system is coincident with an origin of the global coordinate system.

6. The method of claim 4, wherein the information on the center coordinate system further comprises information on azimuth and information on elevation of an origin of the center coordinate system in relation to a global coordinate system.

7. The method of claim 1,
    wherein the initial viewpoint information indicating the initial viewpoint that is used.

8. The method of claim 2, wherein the initial viewpoint is a viewpoint that is a viewpoint of when a 360-degree video scene including the viewpoints is initially reproduced.

9. The method of claim 2, wherein the initial viewpoint is a viewpoint that is returned from another viewpoint included in the viewpoints.

10. The method of claim 1, wherein the metadata comprises information on a switchable viewpoints indicating viewpoints for which viewpoint switching is allowed.

11. The method of claim 1, wherein the metadata comprises information on a selectable viewpoints indicating viewpoints for which viewpoint selection is needed.

12. The method of claim 1,
    wherein the metadata comprises information on a first track, and
    the information on the first track comprises track ID information for referring to a second track different from the first track.

13. A 360-degree video transmission apparatus for processing 360-degree video data, the apparatus comprising:
    a projection processor configured to derive two-dimension (2D) pictures of 360-degree video;
    a metadata processor configured to generate metadata;
    a data encoder configured to encode the pictures; and
    an encapsulation processor configured to perform encapsulation based on the encoded pictures and the metadata,
    wherein:
    the metadata comprises initial viewpoint information representing that an initial viewpoint is present, and the initial viewpoint information includes initial viewpoint ID information that indicates the initial viewpoint for a sample to which the initial viewpoint ID information applies.

14. A 360-degree video data processing method performed by a 360-degree video reception apparatus, the method comprising:
    receiving 360-degree video data including encoded pictures;
    obtaining metadata;
    decoding the encoded pictures; and
    rendering the decoded pictures based on the metadata,
    wherein:
    the metadata comprises initial viewpoint information representing that an initial viewpoint is present, and the initial viewpoint information includes initial viewpoint ID information that indicates the initial viewpoint for a sample to which the initial viewpoint ID information applies.

15. A 360-degree video reception apparatus for processing 360-degree video data, the apparatus comprising:
    a receiver configured to receive 360-degree video data including encoded pictures;
    a data decoder configured to decode the encoded pictures; and
    a renderer configured to render the decoded pictures based on metadata derived, wherein:
the metadata comprises initial viewpoint information representing that an initial viewpoint is present, and the initial viewpoint information includes initial viewpoint ID information that indicates the initial viewpoint for a sample to which the initial viewpoint ID information applies.

\* \* \* \* \*